United States Patent
Ozawa

(10) Patent No.: US 10,621,927 B2
(45) Date of Patent: Apr. 14, 2020

(54) DISPLAY DEVICE

(71) Applicant: Japan Display Inc., Tokyo (JP)

(72) Inventor: Yutaka Ozawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/374,434

(22) Filed: Apr. 3, 2019

(65) Prior Publication Data

US 2019/0311684 A1 Oct. 10, 2019

(30) Foreign Application Priority Data

Apr. 4, 2018 (JP) ................. 2018-072709

(51) Int. Cl.
G09G 3/34 (2006.01)
G09G 3/36 (2006.01)
G02F 1/1362 (2006.01)
G02F 1/1368 (2006.01)
G02F 1/1335 (2006.01)
F21V 8/00 (2006.01)

(52) U.S. Cl.
CPC ......... G09G 3/3413 (2013.01); G02B 6/0068 (2013.01); G02F 1/1368 (2013.01); G02F 1/133621 (2013.01); G02F 1/136286 (2013.01); G09G 3/3607 (2013.01); G09G 3/3688 (2013.01); G09G 2300/0426 (2013.01); G09G 2300/0439 (2013.01); G09G 2310/08 (2013.01)

(58) Field of Classification Search
CPC ........... G09G 3/3413; G09G 1/136286; G09G 6/0068; G09G 1/133621; G09G 1/1368; G09G 3/3688; G09G 3/3607; G09G 2300/0426; G09G 2310/08; G09G 2300/0439; G09G 6/0055; G09G 3/3611; G09G 3/2092; G09G 2370/08; G09G 2300/0857; G09G 2310/0267
See application file for complete search history.

(56) References Cited

U.S. PATENT DOCUMENTS

2005/0231650 A1* 10/2005 Kobori ................. G09G 3/2077
 348/743
2012/0069062 A1* 3/2012 Ishihara ............... G09G 3/3611
 345/690
2013/0076763 A1* 3/2013 Messmer ............. H04N 1/6058
 345/506

FOREIGN PATENT DOCUMENTS

JP 2006-106614 A 4/2006

* cited by examiner

*Primary Examiner* — Abhishek Sarma
(74) *Attorney, Agent, or Firm* — K&L Gates LLP

(57) ABSTRACT

A display device includes: pixels arranged in a row direction and in a column direction in a display area, each pixel including a memory block including memories; memory selection line groups each including memory selection lines electrically coupled to the memory block of each of the pixels belonging to a corresponding row; a memory selection circuit that simultaneously outputs a memory selection signal to the memory selection line groups; light sources; a light source selection circuit that selects which light source is to be used; and a light guide plate that guides the light emitted from selected light source to the display area. One of the memories is selected, and each pixel displays an image based on pixel data being stored in the selected memory. The light source selected by the light source selection circuit emits light over an entire period of time in which the one memory is selected.

6 Claims, 18 Drawing Sheets

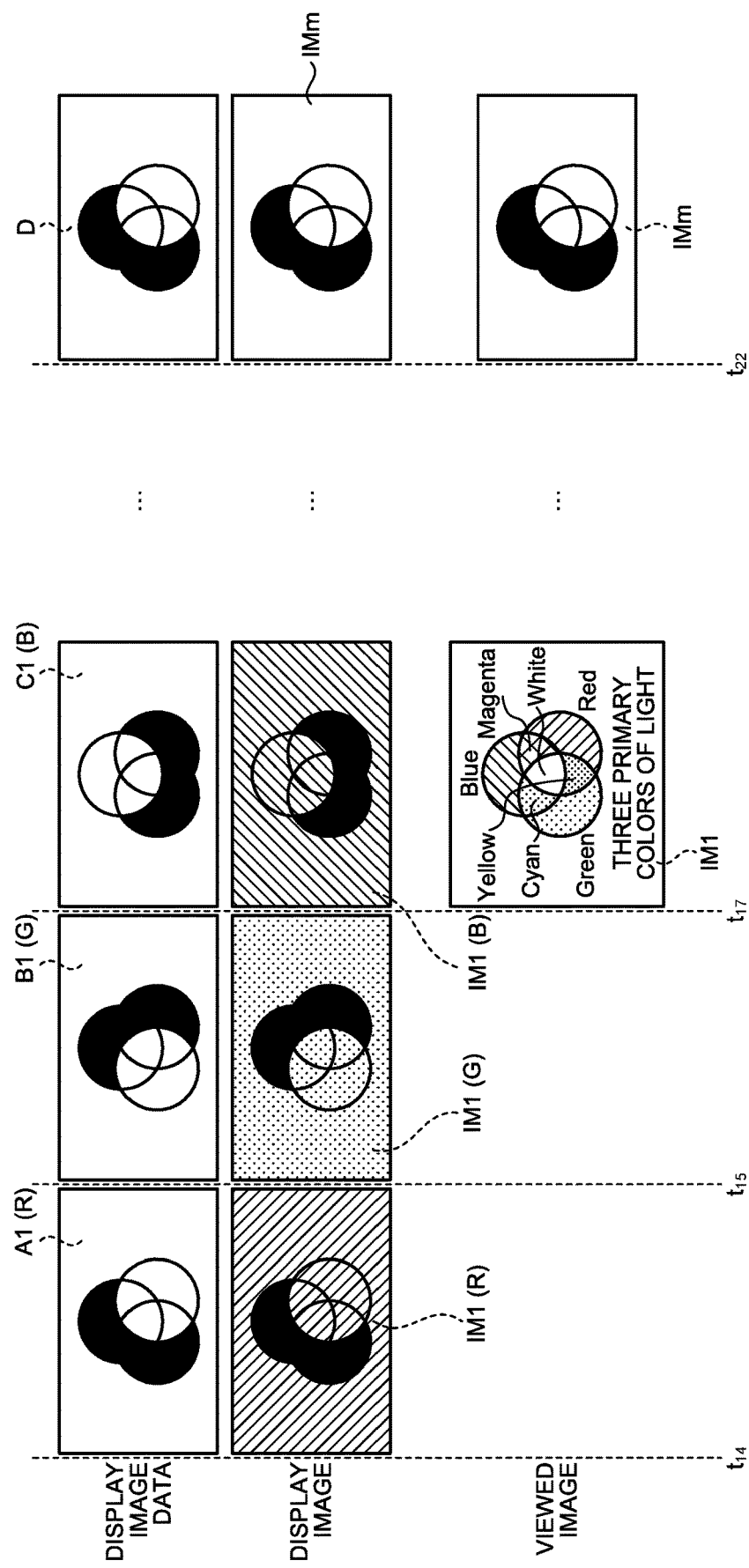

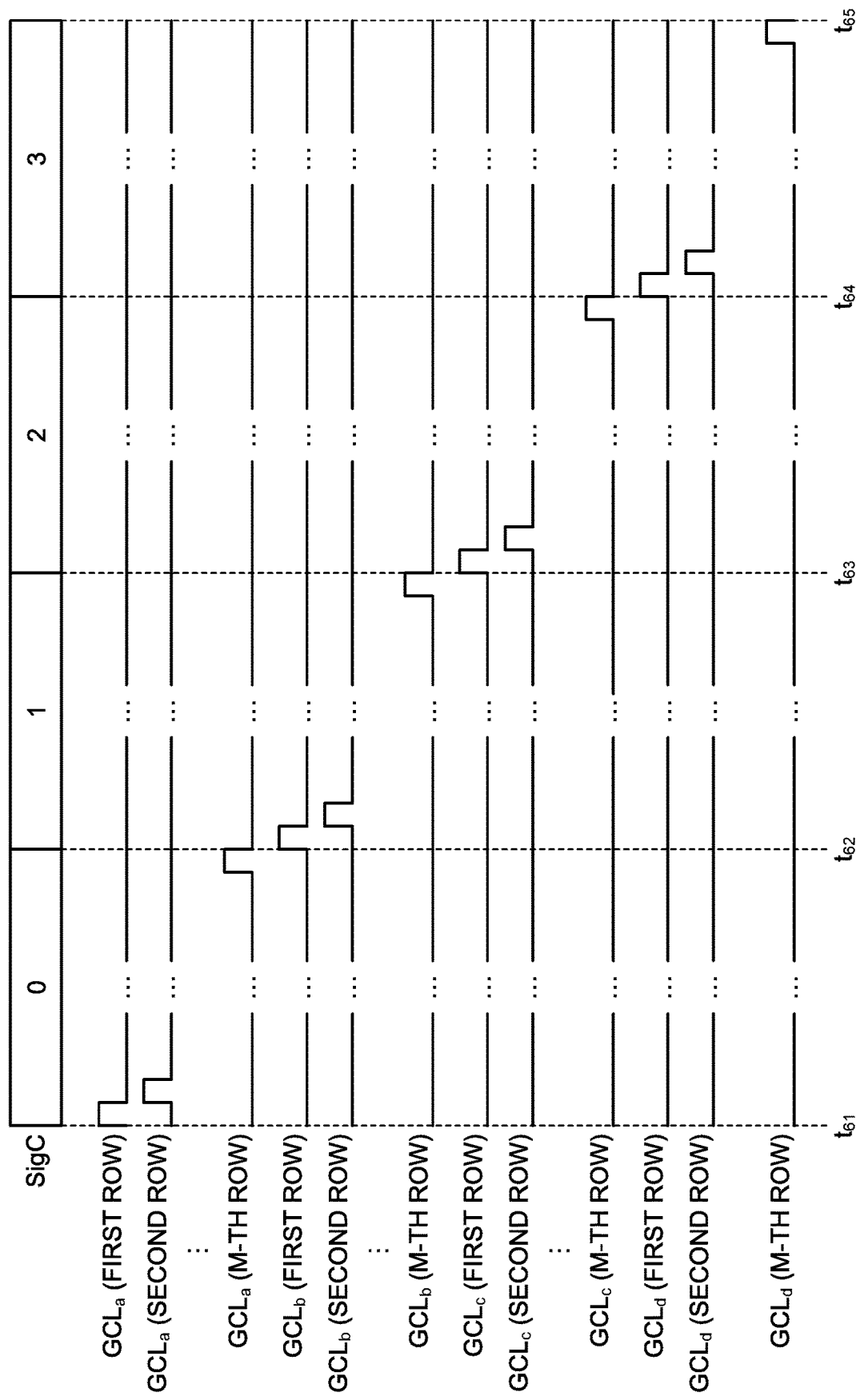

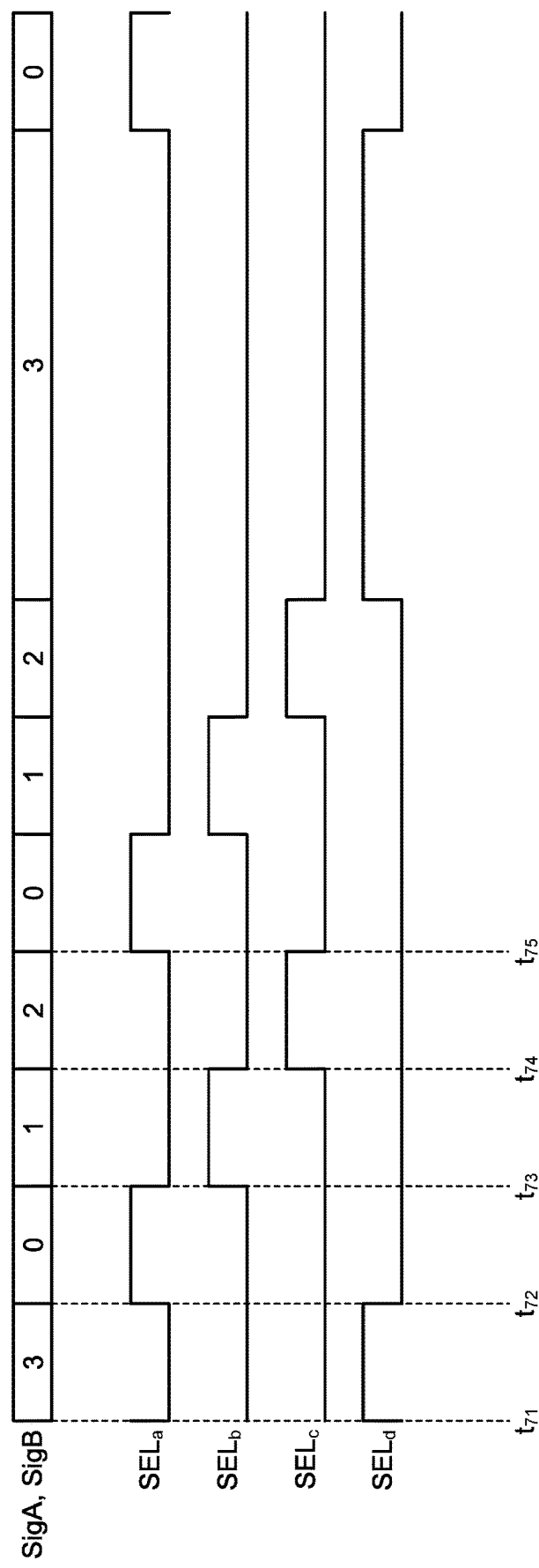

DISPLAY DEVICE

CROSS-REFERENCE TO RELATED APPLICATIONS

This application claims priority from Japanese Application No. 2018-072709, filed on Apr. 4, 2018, the contents of which are incorporated by reference herein in its entirety.

BACKGROUND

1. Technical Field

The present disclosure relates to a display device.

2. Description of the Related Art

Japanese Patent Application Laid-open Publication No. 2006-106614 (JP-A-2006-106614) describes a color liquid crystal display device that performs reflective field sequential display. In this color liquid crystal display, one field display period includes a red display period, a green display period, and a blue display period. One half or one quarter of each of the display periods are allocated for electrical writing, and the remaining one half or three quarters thereof are allocated for lighting of a light source (paragraph [0028]).

The color liquid crystal display device described in JP-A-2006-106614 does not light the light source in one half or one quarter of one field display period, which causes the luminance of images displayed on this color liquid crystal display device to decrease. To increase the luminance of images on the color liquid crystal display device, the luminance of the light source needs to be increased. Such a color liquid crystal display device, however, consumes more power as the luminance of the light source increases.

For the foregoing reasons, there is a need for a display device capable of reducing the power consumption.

SUMMARY

According to an aspect, a display device includes: a plurality of pixels arranged in a row direction in which rows extend and in a column direction in which columns extend in a display area, each pixel including a memory block including a plurality of memories configured to store pixel data; a plurality of memory selection line groups provided for the respective rows, each group including a plurality of memory selection lines electrically coupled to the memory block of each of the pixels belonging to a corresponding one of the rows; a memory selection circuit configured to simultaneously output, to the memory selection line groups, a memory selection signal for selecting one of the memories in the memory block; a plurality of light sources configured to emit light in a plurality of colors; a light source selection circuit configured to, in synchronization with the selection of the memory, select which light source is to be used to emit light; and a light guide plate configured to guide, to the display area, the light emitted from the light source selected from the light sources. Each of the pixels is configured such that one of the memories is selected in accordance with the memory selection line supplied with the memory selection signal and the pixel displays an image based on the pixel data being stored in the selected memory. The light source selected by the light source selection circuit emits the light over an entire period of time in which the one memory is selected.

BRIEF DESCRIPTION OF THE DRAWINGS

FIG. 12 is a diagram illustrating images sequentially displayed on the display device according to the first embodiment;

FIG. 19 is a timing chart of operation timing of a gate line selection circuit of the display device according to the second embodiment; and FIG. 20 is a timing chart of operation timing of a memory selection circuit of the display device according to the second embodiment.

DETAILED DESCRIPTION

Figure 1:
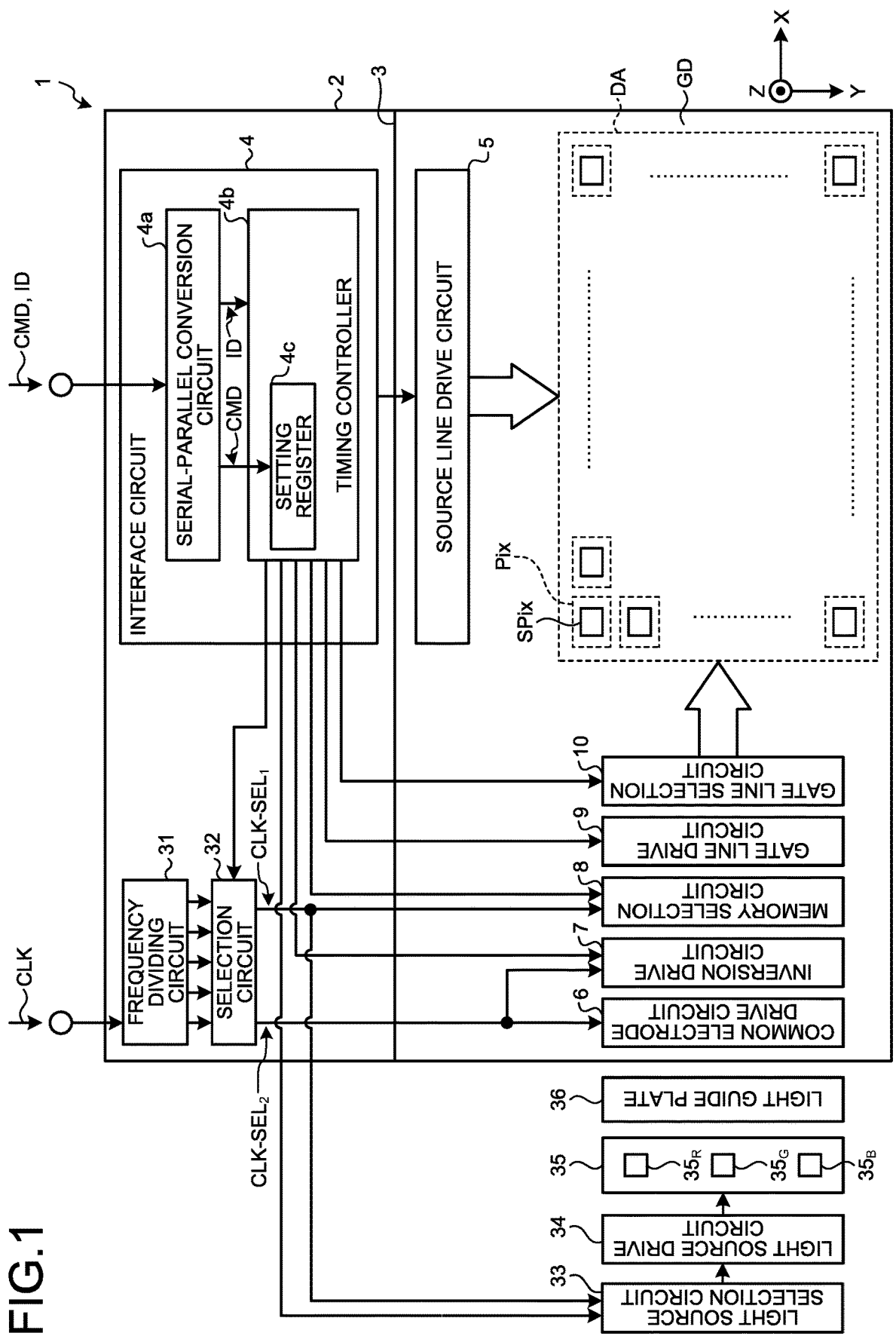
FIG. 1 is a diagram illustrating an overview of an overall configuration of a display device according to a first embodiment.

The following describes modes (embodiments) for carrying out the present invention in detail with reference to the drawings. The present invention is not limited to the description of the embodiments given below. Components described below include those easily conceivable by those skilled in the art or those substantially identical thereto. Furthermore, the components described below can be combined as appropriate. What is disclosed herein is merely an example, and the present invention naturally encompasses appropriate modifications easily conceivable by those skilled in the art while maintaining the gist of the invention. To further clarify the description, widths, thicknesses, shapes, and the like of various parts will be schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

1. First Embodiment 1-1. Overall Configuration

FIG. 1 is a diagram illustrating an overview of an overall configuration of a display device according to a first embodiment. A display device 1 includes a first panel 2 and a second panel 3 disposed so as to be opposed to the first panel 2. The display device 1 has a display area DA in which an image is displayed and a frame area GD outside the display area DA. In the display area DA, a liquid crystal layer is sealed between the first panel 2 and the second panel 3.

In the first embodiment, the display device 1 is a liquid crystal display device using the liquid crystal layer. However, the present disclosure is not limited thereto. The display device 1 may be an organic electroluminescent (EL) display device using organic EL elements instead of the liquid crystal layer.

In the display area DA, a plurality of pixel regions Pix are arranged in a matrix of N columns (where N is a natural number) arranged in an X-direction and M rows (where M is a natural number) arranged in a Y-direction. The X-direction is parallel to principal surfaces of the first panel 2 and the second panel 3, and the Y-direction is parallel to the principal surfaces of the first panel 2 and the second panel 3 and intersects the X-direction.

An interface circuit 4, a source line drive circuit 5, a common electrode drive circuit 6, an inversion drive circuit 7, a memory selection circuit 8, a gate line drive circuit 9, a gate line selection circuit 10, a frequency dividing circuit 31, and a selection circuit 32 are disposed in the frame area GD. A configuration can be employed in which, of these circuits, the interface circuit 4, the source line drive circuit 5, the common electrode drive circuit 6, the inversion drive circuit 7, the memory selection circuit 8, the frequency dividing circuit 31, and the selection circuit 32 are built into an integrated circuit (IC) chip, and the gate line drive circuit 9 and the gate line selection circuit 10 are provided on the first panel 2. Alternatively, a configuration can be employed in which the group of the circuits built into the IC chip is provided in a processor outside the display device, and the circuits are coupled to the display device.

The display device 1 includes a light source selection circuit 33, a light source drive circuit 34, a light source unit 35, and a light guide plate 36. The light source unit 35 includes a light source $35_R$ that emits light in red (R), a light source $35_G$ that emits light in green (G), and a light source $35_B$ that emits light in blue (B).

In the first embodiment, the light sources $35_R$, $35_G$, and $35_B$ are light-emitting diodes, but the present disclosure is not limited thereto. Other examples of the light sources include cold cathode ray tubes and organic electroluminescent (EL) light emitting elements. In the first embodiment, the light source unit 35 emits light in red (R), green (G), and blue (B), but the present disclosure is not limited thereto. The light source unit 35 may emit light in other plurality of colors.

Pixels SPix are provided corresponding to the M×N pixel regions Pix. In the first embodiment, each of the pixel regions Pix is provided with one of the pixels SPix on a one-to-one basis, but the present disclosure is not limited thereto. Each of the pixel regions Pix may be provided with more than one of the pixels SPix. In the first embodiment, since one pixel SPix is provided corresponding to each of the pixel regions Pix, M×N pixels SPix are arranged in the display area DA.

Each of the pixels SPix includes a plurality of memories. In the first embodiment, the memories are four memories: a first memory to a fourth memory, but the present disclosure is not limited thereto. The memories may be three or less memories, or may be five or more memories.

In the first embodiment, since each of the pixels SPix includes four memories, M×N×4 memories are arranged in the display area DA. In the first embodiment, since each of the pixels SPix includes four memories, N×4 memories are arranged in one row of the M×N pixel regions Pix.

Each of the pixels SPix performs display of the pixel SPix based on sub-pixel data being stored in a selected one of the first to fourth memories included in the sub-pixel SPix.

The interface circuit 4 includes a serial-parallel conversion circuit 4a and a timing controller 4b. The timing controller 4b includes a setting register 4c. The serial-parallel conversion circuit 4a is serially supplied with command data CMD and image data ID from an external circuit. Examples of the external circuit include a host central processing unit (CPU) and an application processor, but the present disclosure is not limited thereto.

The serial-parallel conversion circuit 4a converts the supplied command data CMD into parallel data, and outputs the parallel data to the setting register 4c. Values for controlling the source line drive circuit 5, the inversion drive circuit 7, the memory selection circuit 8, the gate line drive circuit 9, the gate line selection circuit 10, the selection circuit 32, and the light source selection circuit 33 are set in the setting register 4c based on the command data CMD.

The serial-parallel conversion circuit 4a converts the supplied image data ID into parallel data, and outputs the parallel data to the timing controller 4b. The timing controller 4b outputs the image data ID to the source line drive circuit 5 based on the values set in the setting register 4c. The timing controller 4b also controls the inversion drive circuit 7, the memory selection circuit 8, the gate line drive circuit 9, the gate line selection circuit 10, the selection circuit 32, and the light source selection circuit 33 based on the values set in the setting register 4c.

The frequency dividing circuit 31 is supplied with a reference clock signal CLK from an external circuit. Examples of the external circuit include a clock generator, but the present disclosure is not limited thereto.

The frequency dividing circuit 31 outputs a plurality of clock signals having different frequencies to the selection circuit 32 based on the reference clock signal CLK. In detail, the frequency dividing circuit 31 outputs a plurality of frequency-divided clock signals obtained by dividing the frequency of the reference clock signal CLK at a plurality of frequency dividing ratios to the selection circuit 32.

The selection circuit 32 selects one of the frequency-divided clock signals as a first selected clock signal CLK-SEL$_1$ under the control of the timing controller 4b. The selection circuit 32 outputs the first selected clock signal CLK-SEL$_1$ to the memory selection circuit 8 and the light source selection circuit 33. The selection circuit 32 selects one of the frequency-divided clock signals as a second selected clock signal CLK-SEL$_2$ under the control of the timing controller 4b. The selection circuit 32 outputs the second selected clock signal CLK-SEL$_2$ to the common electrode drive circuit 6 and the inversion drive circuit 7. The frequency of the first selected clock signal CLK-SEL$_1$ and the frequency of the second selected clock signal CLK-SEL$_2$ may be equal to or different from each other.

In the first embodiment, the display device 1 employs a common inversion driving method. Since the display device 1 employs the common inversion driving method, the common electrode drive circuit 6 inverts the potential (common potential) of a common electrode in synchronization with the second selected clock signal CLK-SEL$_2$. The inversion drive circuit 7 inverts the potential of a pixel electrode in synchronization with the second selected clock signal CLK-SEL$_2$ under the control of the timing controller 4b. Thus, the display device 1 can implement the common inversion driving method. In the first embodiment, the display device 1 is what is called a normally black display device that displays a black color when no voltage is applied to a liquid crystal and displays a white color when a voltage is applied to the liquid crystal. The normally black display device displays the black color when the potential of the pixel electrode is in phase with the common potential, and displays the white color when the potential of the pixel electrode is out of phase with the common potential.

To display the image on the display device 1, sub-pixel data needs to be stored in each of the first to fourth memories of each of the pixels SPix. To store the sub-pixel data into each of the memories, the gate line drive circuit 9 outputs a gate signal for selecting one row of the M×N pixels SPix under the control of the timing controller 4b.

In a MIP liquid crystal display device with each of the pixels SPix having one memory, one gate line is provided for each row (pixel row). In the first embodiment, however, each of the pixels SPix includes the four memories of the first to fourth memories. Thus, in the first embodiment, four gate lines are arranged for each of the rows. The four gate lines are electrically coupled to the first to fourth memories of each of the pixels SPix included in corresponding one of the rows. If the pixels SPix are operated by the gate signal and an inverted gate signal obtained by inverting the gate signal, eight gate lines are arranged for each of the rows.

The four or eight gate lines arranged for each of the rows correspond to a gate line group. In the first embodiment, since the display device 1 includes the M rows of the pixels SPix, M gate line groups are arranged.

The gate line drive circuit 9 includes M output terminals corresponding to the M rows of the pixels SPix. Under the control of the timing controller 4b, the gate line drive circuit 9 sequentially outputs the gate signal for selecting each of the M rows, from its respective one of the M output terminals.

Under the control of the timing controller 4b, the gate line selection circuit 10 selects one of the four gate lines arranged in one row. This selection causes the gate signal output from the gate line drive circuit 9 to be supplied to the selected one of the four gate lines arranged in one row.

Under the control of the timing controller 4b, the source line drive circuit 5 outputs sub-pixel data to each of the memories selected by the gate signal. Through this process, sub-pixel data is sequentially stored in the first to fourth memories of each of the pixels.

The display device 1 line-sequentially scans the M rows of the pixels SPix to store sub-pixel data of one frame data into the first memory of each of the pixels SPix. The display device 1 performs the line-sequential scanning four times to store four pieces of frame data into the first to fourth memories of each of the pixels SPix.

In this operation, the display device 1 can employ a procedure of writing to the first memory, writing to the second memory, writing to the third memory, and writing to the fourth memory for each scanning operation of one row. The display device 1 can store sub-pixel data into the first to fourth memories of each of the pixels SPix in one line-sequential scanning operation by performing the above-described scanning on the first to M-th rows.

In the first embodiment, four memory selection lines are arranged for each row. The four memory selection lines are electrically coupled to the first to fourth memories of each of the N pixels SPix included in a corresponding one of the rows. If the pixels SPix are operated by a memory selection signal and an inverted memory selection signal obtained by inverting the memory selection signal, eight memory selection lines are arranged for each of the rows.

The four or eight memory selection lines arranged for each of the rows correspond to a memory selection line group. In the first embodiment, the display device 1 includes M rows of the pixels SPix, and therefore, includes M memory selection line groups arranged therein.

Under the control of the timing controller 4b, the memory selection circuit 8 simultaneously selects one of the first to fourth memories of each of the pixels SPix in synchronization with the first selected clock signal CLK-SEL$_1$. More specifically, the first memories of all the pixels SPix are simultaneously selected. Alternatively, the second memories of all the pixels SPix are simultaneously selected. Alternatively, the third memories of all the pixels SPix are simultaneously selected. Alternatively, the fourth memories of all the pixels SPix are simultaneously selected. Accordingly, the display device 1 can display one of four images by switching which of the first to fourth memories of each of the pixels SPix is selected. Consequently, the display device 1 can change the image at once, and can change the image in a short period of time. The display device 1 can also perform animation display (moving image display) by sequentially switching which of the first to fourth memories of each of the pixels SPix is selected.

Under the control of the timing controller 4b, the light source selection circuit 33 selects one of the light sources $35_R$, $35_G$, and $35_B$ in synchronization with the first selected clock signal CLK-SEL$_1$. For example, the light source selection circuit 33 sequentially selects each of the light sources $35_R$, $35_G$, and $35_B$ in synchronization with the first selected clock signal CLK-SEL$_1$. The light source drive circuit 34 outputs a drive current to one of the light sources $35_R$, $35_G$, and $35_B$ selected by the light source selection circuit 33 to drive the selected one of the light sources $35_R$, $35_G$, and $35_B$. The selected one of the light sources $35_R$, $35_G$, and $35_B$ emits the light to the light guide plate 36. The light guide plate 36 orients the direction of travel of the light emitted from the one of the light sources $35_R$, $35_G$, and $35_B$ toward the pixel electrode (reflective electrode), which is to be described later, in the pixel SPix. The light reflected by the pixel electrode enters an eye of a viewer. Thus, the display device 1 can sequentially display a red (R) image, a green (G) image, and a blue (B) image in synchronization with the first selected clock signal CLK-SEL$_1$. As a result, the viewer can visually recognize a color image in which the colors of the red (R) image, the green (G) image, and the blue (B) image are mixed.

1-2. Sectional Structure

Figure 2:
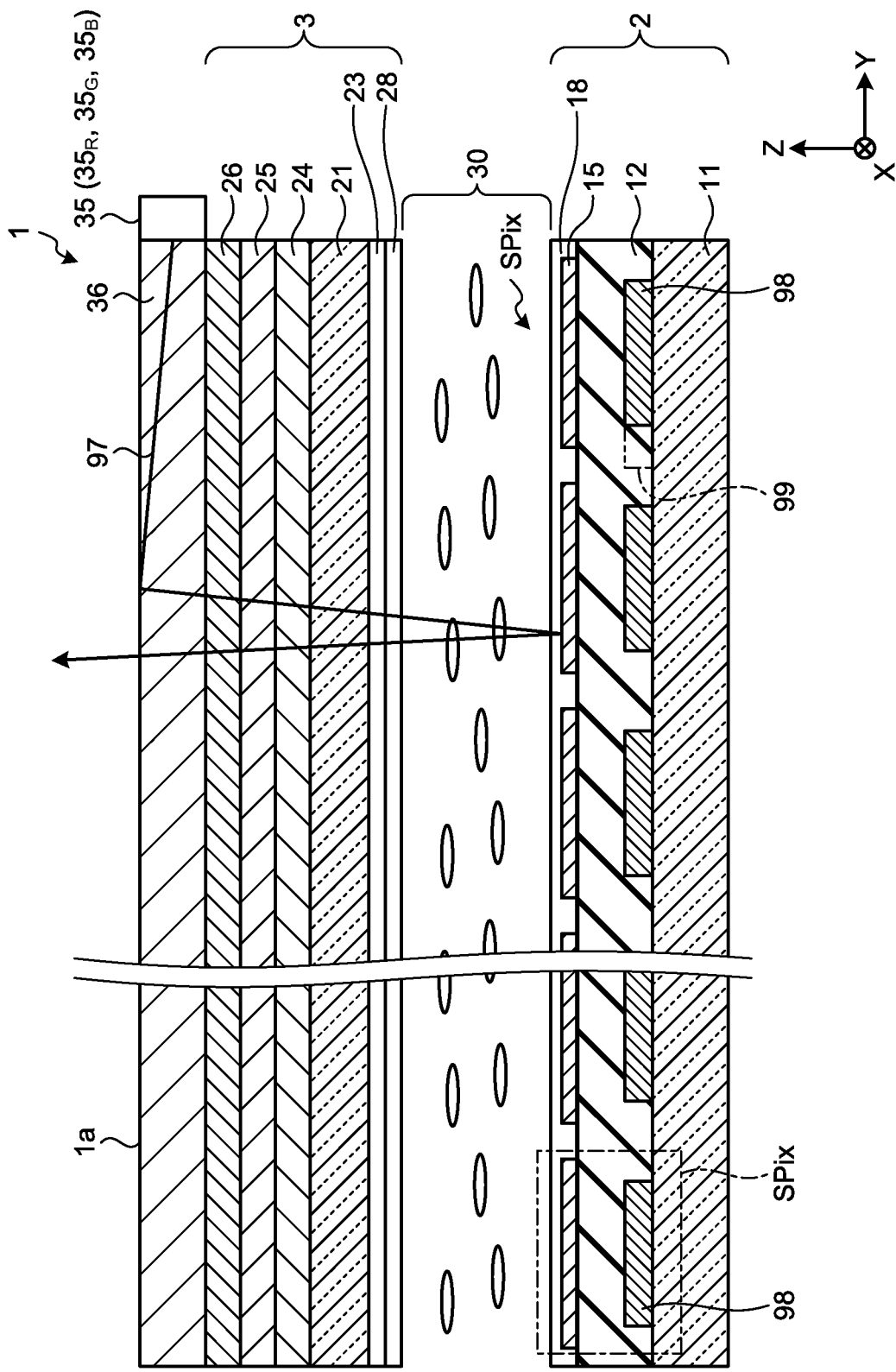
FIG. 2 is a sectional view of the display device according to the first embodiment.

FIG. 2 is a sectional view of the display device according to the first embodiment. As illustrated in FIG. 2, the display device 1 includes the first panel 2, the second panel 3, a liquid crystal layer 30, the light source unit 35, and the light guide plate 36. The second panel 3 is disposed so as to be opposed to the first panel 2. The light guide plate 36 is bonded to a principal surface of the second panel 3 facing in a Z-direction. The liquid crystal layer 30 is provided between the first panel 2 and the second panel 3. A surface that is one principal surface of the light guide plate 36 serves as a display surface 1a for displaying the image.

While the light source unit 35 is not emitting the light, light incident from an exterior on the display surface 1a side is reflected by a pixel electrode (reflective electrode) 15 of the first panel 2 and then exits from the display surface 1a. The display device 1 is a reflective liquid crystal display device that uses this reflected light to display the image on the display surface 1a. In this specification, a direction parallel to the display surface 1a corresponds to the X-direction, and a direction intersecting the X-direction in a plane parallel to the display surface 1a corresponds to the Y-direction. A direction orthogonal to the display surface 1a corresponds to the Z-direction.

While the light source unit 35 is emitting the light, light 97 incident from the light source unit 35 onto a side surface of the light guide plate 36 is reflected by the display surface 1a in a direction opposite to the Z-direction. The light 97 is then reflected by the pixel electrode 15 and exits from the display surface 1a.

The first panel 2 includes a first substrate 11, an insulating layer 12, the pixel electrode 15, and an orientation film 18. Examples of the first substrate 11 include a glass substrate and a resin substrate. A surface of the first substrate 11 is provided with circuit elements and various types of wiring, such as the gate lines and data lines, which are not illustrated. The circuit elements include switching elements, such as thin-film transistors (TFTs), and capacitive elements.

The insulating layer 12 is provided on the first substrate 11, and planarizes surfaces of, for example, the circuit elements and the various types of wiring as a whole. A plurality of pixel electrodes 15 are provided on the insulating layer 12. The orientation film 18 is provided between the pixel electrodes 15 and the liquid crystal layer 30. The pixel electrodes 15 are provided in rectangular shapes, one for each of the pixels SPix. The pixel electrodes 15 are made of a metal, such as aluminum (Al) or silver (Ag). The pixel electrodes 15 may have a configuration laminated with these metal materials and a light-transmitting conductive material, such as indium tin oxide (ITO). The pixel electrodes 15 are made using a material having good reflectance, and serve as reflective plates that diffusely reflect the light incident from the exterior.

The light reflected by the pixel electrode 15 is scattered by the diffuse reflection, but travels in a uniform direction toward the display surface 1a. A change in level of a voltage applied to the pixel electrode 15 changes the transmission state of the light in the liquid crystal layer 30 on the upper side of the pixel electrodes 15, that is, the transmission state of the reflected light of each of the pixels SPix.

The second panel 3 includes a second substrate 21, a common electrode 23, an orientation film 28, a ¼ wavelength plate 24, a ½ wavelength plate 25, and a polarizing plate 26. One of both surfaces of the second substrate 21 opposed to the first panel 2 is provided with the common electrode 23. The orientation film 28 is provided between the common electrode 23 and the liquid crystal layer 30. A surface on the display surface 1a side of the second substrate 21 is provided with the ¼ wavelength plate 24, the ½ wavelength plate 25, and the polarizing plate 26 stacked in this order.

Examples of the second substrate 21 include a glass substrate and a resin substrate. The common electrode 23 is made of a light-transmitting conductive material, such as ITO. The common electrode 23 is disposed so as to be opposed to the pixel electrodes 15, and supplies a common potential to each of the pixels SPix.

The liquid crystal layer 30 includes, for example, nematic liquid crystals. A change in level of a voltage between the common electrode 23 and the pixel electrode 15 changes the orientation state of liquid crystal molecules in the liquid crystal layer 30. Through this process, the light passing through the liquid crystal layer 30 is modulated on a per pixel SPix basis.

For example, external light serves as the incident light incident from the display surface 1a side of the display device 1, and reaches the pixel electrodes 15 through the second panel 3 and the liquid crystal layer 30. The incident light is reflected on the pixel electrodes 15 of the pixels SPix. The reflected light is modulated on a per pixel SPix basis and exits from the display surface 1a. Through this process, the image is displayed.

1-3. Circuit Configuration

Figure 3:
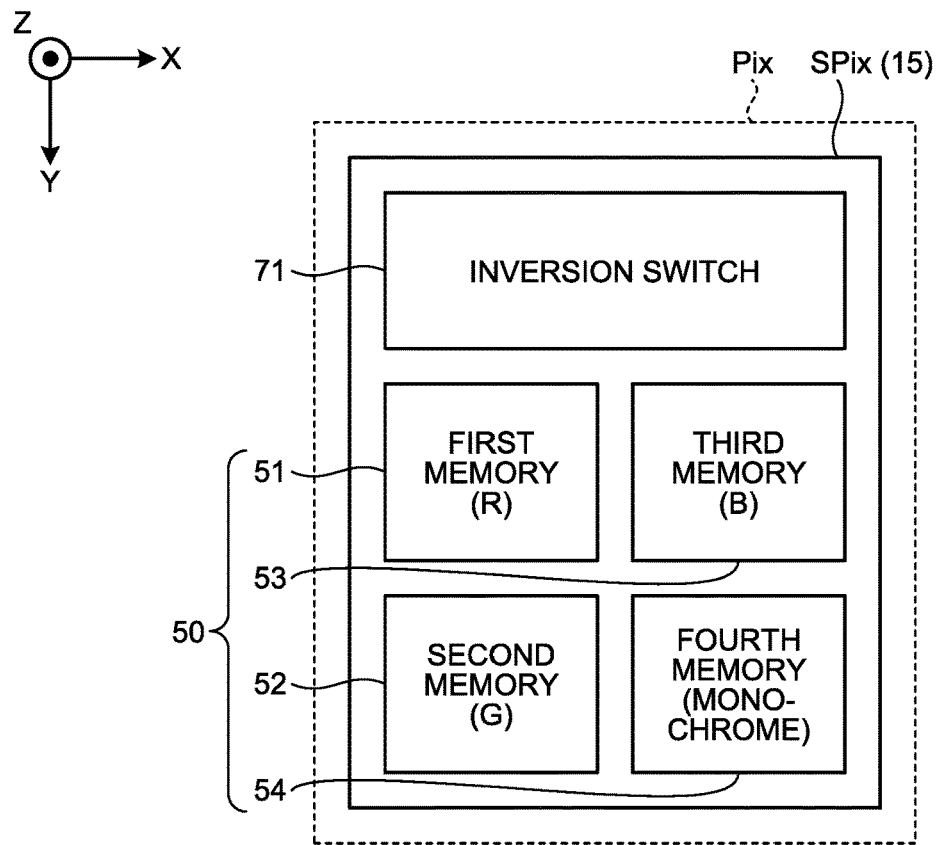
FIG. 3 is a diagram illustrating a pixel of the display device according to the first embodiment.

FIG. 3 is a diagram illustrating the pixel of the display device according to the first embodiment. The pixel region Pix is provided corresponding to one pixel SPix (pixel electrode 15).

The pixel SPix includes a memory block 50 and an inversion switch 71. The memory block 50 includes a first memory 51, a second memory 52, a third memory 53, and a fourth memory 54. The first memory 51 stores therein pixel data for displaying a red (R) image. The second memory 52 stores therein pixel data for displaying a green (G) image. The third memory 53 stores therein pixel data for displaying a blue (B) image. The fourth memory 54 stores therein pixel data for displaying a monochrome image.

The fourth memory 54 corresponds to a predetermined memory.

Each of the first to fourth memories 51 to 54 is a memory cell that stores therein one-bit data. However, the present disclosure is not limited thereto. Each of the first to fourth memories 51 to 54 may be a memory cell that stores therein data of two or more bits.

The inversion switch 71 is electrically coupled between the first to fourth memories 51 to 54 and the pixel electrode 15 (refer to FIG. 2). Based on the sub-pixel data output from a selected one of the first to fourth memories 51 to 54, the inversion switch 71 outputs, to the pixel electrode 15, a display signal supplied from the inversion drive circuit 7 unchanged or in an inverted form. The period of the inversion of the display signal is the same as the period of the inversion of the potential (common potential) of the common electrode 23.

The inversion switch 71 corresponds to a switch circuit.

As illustrated in FIG. 2, the pixel SPix includes a backplane 98 and the reflective electrode 15. The backplane 98 includes the memory block 50 and the inversion switch 71. The reflective electrode 15 is provided above the backplane 98 with the insulating layer 12 interposed therebetween. The pixels SPix can employ not only the configuration in which all the backplane 98 lie directly below the pixel electrodes 15 in a plan view, but also a configuration in which some or all of the backplane 98 are provided in a position 99 deviated from the pixel electrode 15 in the plan view.

The change in the orientation state of the liquid crystal molecules between the reflective electrode 15 of each of the pixels SPix and the common electrode 23 changes the display state of the pixel SPix. Therefore, a part of the common electrode 23 opposed to the reflective electrode 15 and the liquid crystal molecules located therebetween can be regarded together as one pixel SPix.

Figure 4:
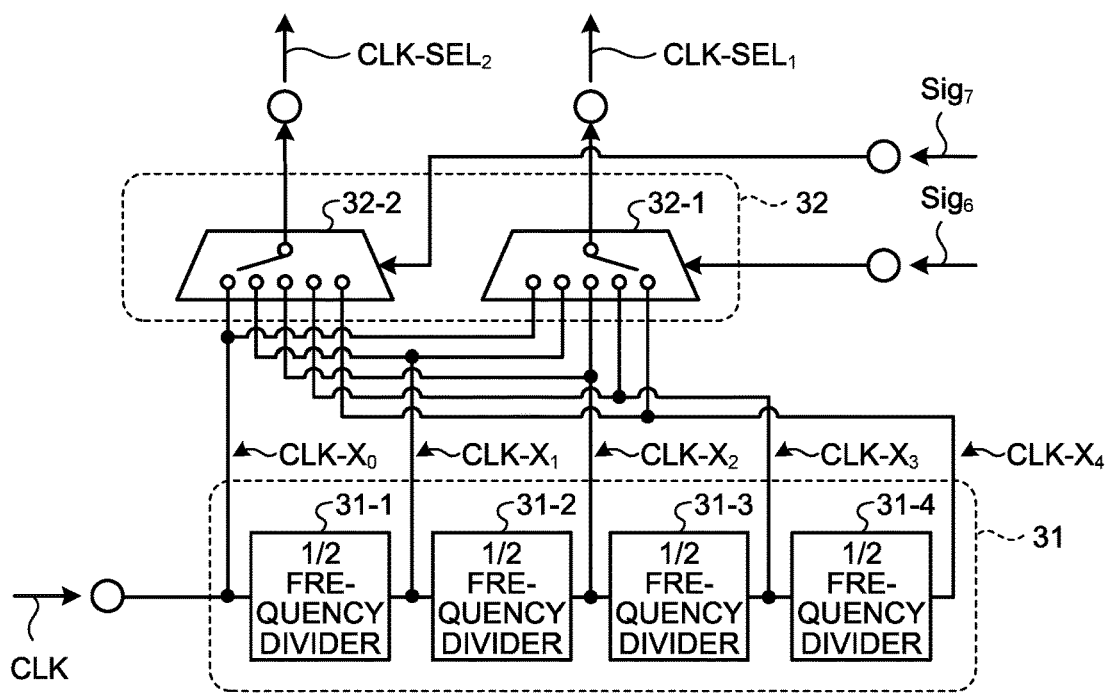
FIG. 4 is a diagram illustrating a circuit configuration of a frequency dividing circuit and a selection circuit of the display device according to the first embodiment.

FIG. 4 is a diagram illustrating a circuit configuration of the frequency dividing circuit and the selection circuit of the display device according to the first embodiment.

The frequency dividing circuit 31 includes a first ½ frequency divider 31-1 to a fourth ½ frequency divider 31-4 that are daisy-chained. Each of the first ½ frequency divider 31-1 to the fourth ½ frequency divider 31-4 can have a flip-flop configuration.

The first ½ frequency divider 31-1 is supplied with a first frequency-divided clock signal CLK-$X_0$ that is the reference clock signal CLK. The first frequency-divided clock signal CLK-$X_0$ can be considered to be a signal obtained by dividing the frequency of the reference clock signal CLK into a ½ frequency thereof.

The first ½ frequency divider 31-1 outputs, to the second ½ frequency divider 31-2 and the selection circuit 32, a second frequency-divided clock signal CLK-$X_1$ obtained by dividing the frequency of the first frequency-divided clock signal CLK-$X_0$ by 2. The second ½ frequency divider 31-2 outputs, to the third ½ frequency divider 31-3 and the selection circuit 32, a third frequency-divided clock signal CLK-$X_2$ obtained by dividing the frequency of the second frequency-divided clock signal CLK-$X_1$ by 2.

The third ½ frequency divider 31-3 outputs, to the fourth ½ frequency divider 31-4 and the selection circuit 32, a fourth frequency-divided clock signal CLK-$X_3$ obtained by dividing the frequency of the third frequency-divided clock signal CLK-$X_2$ by 2. The fourth ½ frequency divider 31-4 outputs, to the selection circuit 32, a fifth frequency-divided clock signal CLK-$X_4$ obtained by dividing the frequency of the fourth frequency-divided clock signal CLK-$X_3$ by 2.

The frequency dividing circuit 31 corresponds to a clock signal output circuit.

The selection circuit 32 includes a first selector 32-1 and a second selector 32-2. The first selector 32-1 is supplied with the first to fifth frequency-divided clock signals CLK-$X_0$ to CLK-$X_4$. The first selector 32-1 selects, as the first selected clock signal CLK-$SEL_1$, one frequency-divided clock signal from among the first to fifth frequency-divided clock signals CLK-$X_0$ to CLK-$X_4$ based on a control signal $Sig_6$ supplied from the timing controller 4b. The first selector 32-1 outputs the first selected clock signal CLK-$SEL_1$ to the memory selection circuit 8 and the light source selection circuit 33.

The second selector 32-2 is supplied with the first to fifth frequency-divided clock signals CLK-$X_0$ to CLK-$X_4$. The second selector 32-2 selects, as the second selected clock signal CLK-$SEL_2$, one frequency-divided clock signal from among the first to fifth frequency-divided clock signals CLK-$X_0$ to CLK-$X_4$ based on a control signal $Sig_7$ supplied from the timing controller 4b. The second selector 32-2 outputs the second selected clock signal CLK-$SEL_2$ to the common electrode drive circuit 6 and the inversion drive circuit 7.

In the first embodiment, the frequency dividing circuit 31 includes the first to fourth ½ frequency dividers 31-1 to 31-4, but the present disclosure is not limited thereto. The frequency dividing circuit 31 may include ⅓ frequency dividers or ¼ frequency dividers. In the first embodiment, the frequency dividing circuit 31 includes the first to fourth ½ frequency dividers 31-1 to 31-4, but the present disclosure is not limited thereto. The frequency dividing circuit 31 may include three or less, or five or more frequency dividers, and may output three or less, or five or more frequency-divided clock signals to the selection circuit 32. In the first embodiment, the frequency dividing circuit 31 includes the first to fourth ½ frequency dividers 31-1 to 31-4 that are daisy-chained, but the present disclosure is not limited thereto. The frequency-divided clock signals can be generated by various circuit configurations.

In the first embodiment, the display device 1 includes the frequency dividing circuit 31 as the clock signal output circuit, but the present disclosure is not limited thereto. The display device 1 may include, instead of the frequency dividing circuit 31, a multiplier circuit as the clock signal output circuit, which outputs a plurality of multiplied clock signals obtained by multiplying the frequency of the reference clock signal CLK by a plurality of multiplication factors to the selection circuit 32. In this case, the multiplier circuit corresponds to the clock signal output circuit.

Figure 5:
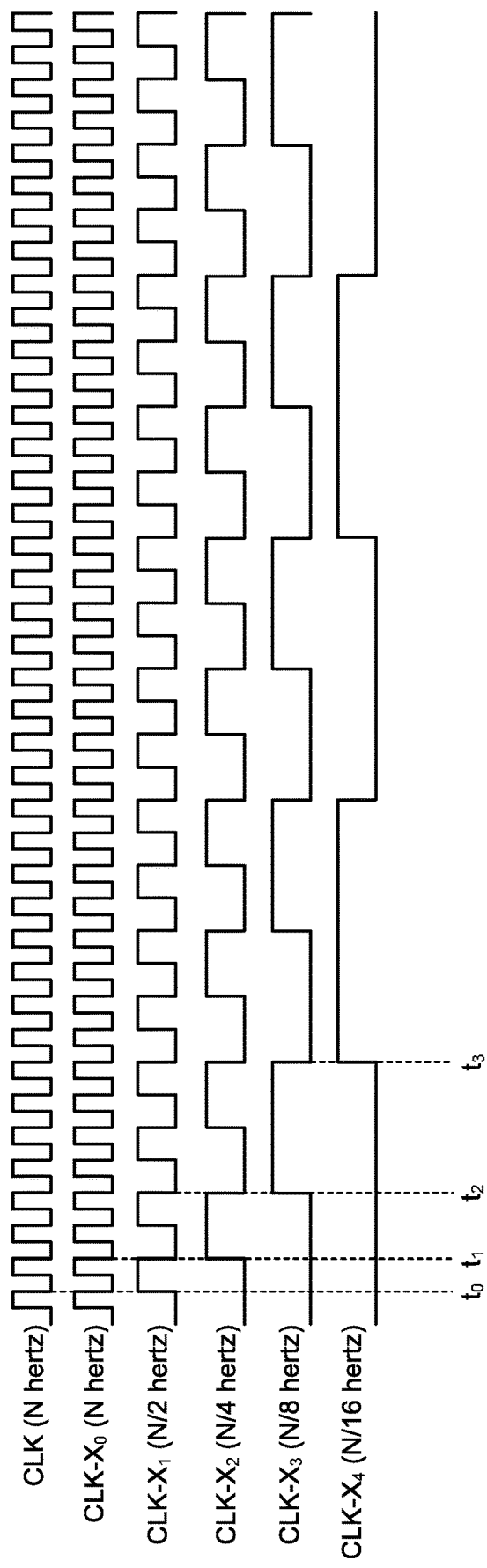
FIG. 5 is a diagram illustrating waveforms of frequency-divided clock signals of the display device according to the first embodiment.

FIG. 5 is a diagram illustrating waveforms of the frequency-divided clock signals of the display device according to the first embodiment.

The frequency of the reference clock signal CLK is assumed to be N hertz (where N is a positive number). The frequency of the first frequency-divided clock signal CLK-$X_0$ is N hertz, which is the same as the frequency of the reference clock signal CLK.

The first ½ frequency divider 31-1 outputs the second frequency-divided clock signal CLK-$X_1$ obtained by dividing the frequency of the first frequency-divided clock signal CLK-$X_0$ by 2. The frequency of the second frequency-divided clock signal CLK-$X_1$ is N/2 hertz, which is ½ times the frequency of the first frequency-divided clock signal CLK-$X_0$. The second frequency-divided clock signal CLK-$X_1$ rises at time $t_0$ that is the time of a falling edge of the first frequency-divided clock signal CLK-$X_0$. Although, in the first embodiment, the second frequency-divided clock signal CLK-$X_1$ rises at the falling edge of the first frequency-divided clock signal CLK-$X_0$, the present disclosure is not limited thereto. The second frequency-divided clock signal CLK-$X_1$ may rise at a rising edge of the first frequency-divided clock signal CLK-$X_0$. The third frequency-divided clock signal CLK-$X_2$, the fourth frequency-divided clock signal CLK-$X_3$, and the fifth frequency-divided clock signal CLK-$X_4$ described below all function the same as the second frequency-divided clock signal CLK-$X_1$.

The second ½ frequency divider 31-2 outputs the third frequency-divided clock signal CLK-$X_2$ obtained by dividing the frequency of the second frequency-divided clock signal CLK-$X_1$ by 2. The frequency of the third frequency-divided clock signal CLK-$X_2$ is N/4 hertz, which is ½ times the frequency of the second frequency-divided clock signal CLK-$X_1$. The third frequency-divided clock signal CLK-$X_2$ rises at time $t_1$ that is the time of a falling edge of the second frequency-divided clock signal CLK-$X_1$.

The third ½ frequency divider 31-3 outputs the fourth frequency-divided clock signal CLK-$X_3$ obtained by dividing the frequency of the third frequency-divided clock signal CLK-$X_2$ by 2. The frequency of the fourth frequency-divided clock signal CLK-$X_3$ is N/8 hertz, which is ½ times the frequency of the third frequency-divided clock signal CLK-$X_2$. The fourth frequency-divided clock signal CLK-$X_3$ rises at time $t_2$ that is the time of a falling edge of the third frequency-divided clock signal CLK-$X_2$.

The fourth ½ frequency divider 31-4 outputs the fifth frequency-divided clock signal CLK-$X_4$ obtained by dividing the frequency of the fourth frequency-divided clock signal CLK-$X_3$ by 2. The frequency of the fifth frequency-divided clock signal CLK-$X_4$ is N/16 hertz, which is ½ times the frequency of the fourth frequency-divided clock signal CLK-X3. The fifth frequency-divided clock signal CLK-$X_4$ rises at time $t_3$ that is the time of a falling edge of the fourth frequency-divided clock signal CLK-$X_3$.

Figure 6:
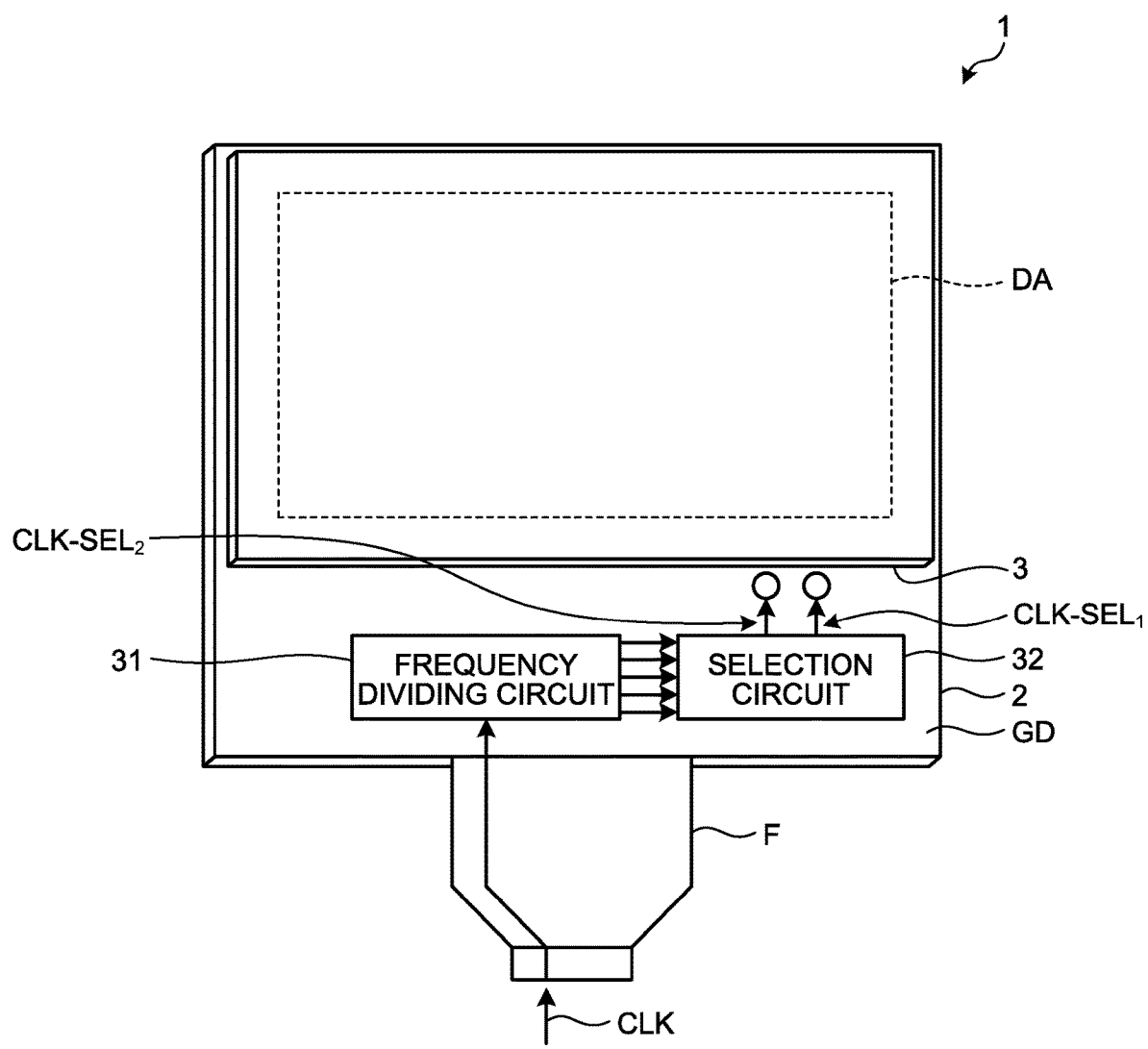
FIG. 6 is a diagram illustrating a module configuration of the display device according to the first embodiment.

FIG. 6 is a diagram illustrating a module configuration of the display device according to the first embodiment. In detail, FIG. 6 is a diagram illustrating an arrangement of the frequency dividing circuit 31 and the selection circuit 32 in the display device 1.

The frequency dividing circuit 31 and the selection circuit 32 are disposed at a portion in the frame area GD where the first panel 2 does not overlap the second panel 3. A flexible substrate F is mounted on the first panel 2. The reference clock signal CLK is supplied to the frequency dividing circuit 31 through the flexible substrate F.

The frequency dividing circuit 31 outputs, to the selection circuit 32, the first to fifth frequency-divided clock signals CLK-$X_0$ to CLK-$X_4$ obtained by dividing the frequency of the reference clock signal CLK. The selection circuit 32 selects, as the first selected clock signal CLK-$SEL_1$, one of the first to fifth frequency-divided clock signals CLK-$X_0$ to CLK-$X_4$. The selection circuit 32 outputs the first selected clock signal CLK-$SEL_1$ to the memory selection circuit 8 and the light source selection circuit 33 (refer to FIG. 1). The selection circuit 32 selects, as the second selected clock signal CLK-$SEL_2$, one of the first to fifth frequency-divided clock signals CLK-$X_0$ to CLK-$X_4$. The selection circuit 32 outputs the second selected clock signal CLK-$SEL_2$ to the common electrode drive circuit 6 and the inversion drive circuit 7 (refer to FIG. 1).

The frequency dividing circuit 31 and the selection circuit 32 may be mounted on the first panel 2 as a chip-on-glass (COG) module. The frequency dividing circuit 31 and the selection circuit 32 may alternatively be mounted on the flexible substrate F as the chip-on-film (COF) module.

Figure 7:
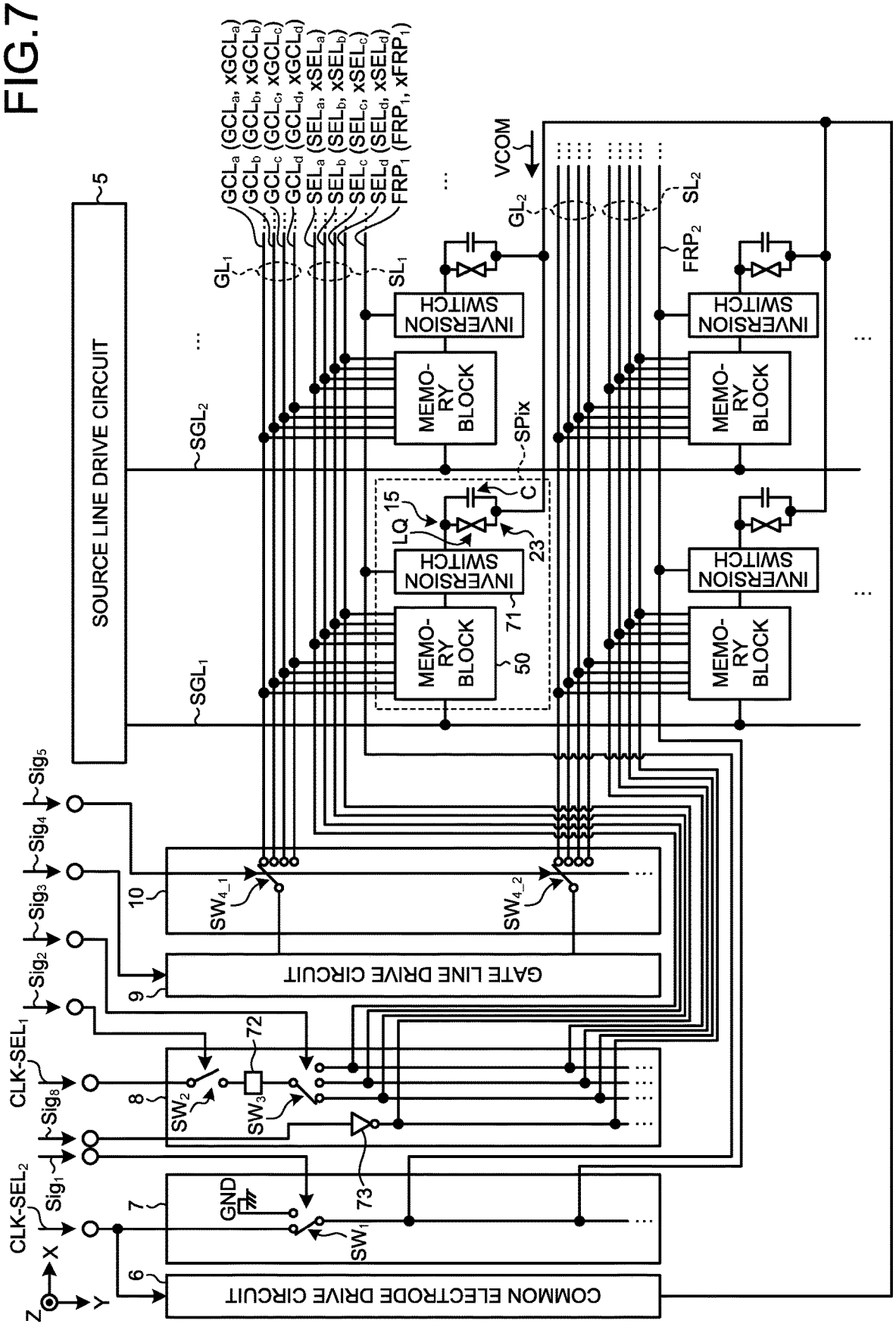
FIG. 7 is a diagram illustrating a circuit configuration of the display device according to the first embodiment.

FIG. 7 is a diagram illustrating a circuit configuration of the display device according to the first embodiment. FIG. 7 illustrates 2×2 pixels SPix.

The pixel SPix includes a liquid crystal LQ, a retention capacitor C, and the pixel electrode 15 (refer to FIG. 2) in addition to the memory block 50 and the inversion switch 71.

The common electrode drive circuit 6 inverts a common potential VCOM common to the pixels SPix in synchronization with the second selected clock signal CLK-$SEL_2$, and outputs the result to the common electrode 23 (refer to FIG. 2). The common electrode drive circuit 6 may output the second selected clock signal CLK-$SEL_2$ unchanged as the common potential VCOM to the common electrode 23, or it may output the second selected clock signal CLK-$SEL_2$ as the common potential VCOM through a buffer circuit for amplifying the current driving capacity thereof to the common electrode 23.

The gate line drive circuit 9 includes the M output terminals corresponding to the M rows of the pixels SPix. The gate line drive circuit 9 sequentially outputs the gate signal for selecting each of the M rows from its respective one of the M output terminals based on a control signal $Sig_4$ supplied from the timing controller 4b.

The gate line drive circuit 9 may be a scanner circuit that sequentially outputs the gate signals from the M output terminals based on the control signals $Sig_4$ (a scan start signal and clock pulse signals). Alternatively, the gate line drive circuit 9 may be a decoder circuit that decodes the encoded control signal $Sig_4$ and outputs the gate signal to the output terminal specified by the control signal $Sig_4$.

The gate line selection circuit 10 includes M switches $SW_{4\_1}$, $SW_{4\_2}$, . . . corresponding to the M rows of the pixels SPix. The M switches $SW_{4\_1}$, $SW_{4\_2}$, . . . are commonly controlled by a control signal $Sig_5$ supplied from the timing controller 4b.

M gate line groups $GL_1$, $GL_2$, . . . are arranged corresponding to the M rows of the pixels SPix on the first panel 2. Each of the M gate line groups $GL_1$, $GL_2$, . . . includes a first gate line $GCL_a$, a second gate line $GCL_b$, a third gate line $GCL_c$, and a fourth gate line $GCL_d$. The first gate line $GCL_a$ is electrically coupled to the first memory 51 (refer to FIG. 3) of a corresponding one of the rows. The second gate line $GCL_b$ is electrically coupled to the second memory 52 (refer to FIG. 3) thereof. The third gate line $GCL_c$ is electrically coupled to the third memory 53 (refer to FIG. 3) thereof. The fourth gate line $GCL_d$ is electrically coupled to the fourth memory 54 (refer to FIG. 3) thereof. Each of the M gate line groups $GL_1$, $GL_2$, . . . extends along the X-direction in the display area DA (refer to FIG. 1).

When the control signal $Sig_5$ indicates a first value, each of the M switches $SW_{4\_1}$, $SW_{4\_2}$, . . . electrically couples a corresponding one of the output terminals of the gate line drive circuit 9 to the first gate line $GCL_a$. When the control signal $Sig_5$ indicates a second value, each of the M switches $SW_{4\_1}$, $SW_{4\_2}$, . . . electrically couples the output terminal of the gate line drive circuit 9 to the second gate line $GCL_b$. When the control signal $Sig_5$ indicates a third value, each of the M switches $SW_{41}$, $SW_{4\_2}$, . . . electrically couples the output terminal of the gate line drive circuit 9 to the third gate line $GCL_c$. When the control signal $Sig_5$ indicates a fourth value, each of the M switches $SW_{4\_1}$, $SW_{4\_2}$, . . . electrically couples the output terminal of the gate line drive circuit 9 to the fourth gate line $GCL_d$.

when the output terminal of the gate line drive circuit 9 is electrically coupled to the first gate line $GCL_a$, the gate signal is supplied to the first memory 51 of each of the pixels SPix. When the output terminal of the gate line drive circuit 9 is electrically coupled to the second gate line $GCL_b$, the gate signal is supplied to the second memory 52 of each of the pixels SPix. When the output terminal of the gate line drive circuit 9 is electrically coupled to the third gate line $GCL_c$, the gate signal is supplied to the third memory 53 of each of the pixels SPix. When the output terminal of the gate line drive circuit 9 is electrically coupled to the fourth gate line $GCL_d$, the gate signal is supplied to the fourth memory 54 of each of the pixels SPix.

N source lines $SGL_1$, $SGL_2$, . . . are arranged corresponding to the N columns of the pixels SPix on the first panel 2. Each of the source lines $SGL_1$, $SGL_2$, . . . extends along the Y-direction in the display area DA (refer to FIG. 1). The source line drive circuit 5 outputs the sub-pixel data to the four memories of each the pixels SPix selected by the gate signal, through the source lines $SGL_1$, $SGL_2$, . . . .

Each of the pixels SPix of the row supplied with the gate signal stores the sub-pixel data supplied to the source lines SGL into one of the first to fourth memories 51 to 54 corresponding to the gate line GCL supplied with the gate signal.

The memory selection circuit 8 includes a switch $SW_2$, a switch $SW_3$, a latch 72, and an inverter 73. The switch $SW_2$ is controlled by a control signal $Sig_2$ supplied from the timing controller 4b. The switch $SW_3$ is controlled by a control signal $Sig_3$ supplied from the timing controller 4b.

The following describes a case of displaying each color (red (R), green (G), or blue (B)) image, that is, a case of reading image data from any of the first to third memories 51 to 53 of each of the pixels SPix. In this case, the timing controller 4b outputs the control signal $Sig_2$ having a first value to the switch $SW_2$. The switch $SW_2$ is turned on in accordance with the control signal $Sig_2$ having the first value supplied from the timing controller 4b. This causes the first selected clock signal $CLK-SEL_1$ to be supplied to the latch 72.

The following describes a case of not displaying each color (red (R), green (G), or blue (B)) image, that is, a case of not reading image data from any of the first to third memories 51 to 53 of each the pixels SPix. In this case, the timing controller 4b outputs the control signal $Sig_2$ having a second value to the switch $SW_2$. The switch $SW_2$ is turned off in accordance with the control signal $Sig_2$ having the second value supplied from the timing controller 4b. This operation prevents the first selected clock signal $CLK-SEL_1$ from being supplied to the latch 72.

When the switch $SW_2$ is on and the first selected clock signal $CLK-SEL_1$ is supplied to the latch 72, the latch 72 keeps the first selected clock signal $CLK-SEL_1$ at a high level for one period of the first selected clock signal $CLK-SEL_1$. When the switch $SW_2$ is off and the first selected clock signal $CLK-SEL_1$ is not supplied to the latch 72, the latch 72 keeps the high level.

M memory selection line groups $SL_1$, $SL_2$, . . . are arranged corresponding to the M rows of the pixels SPix on the first panel 2. Each of the M memory selection line groups $SL_1$, $SL_2$, . . . includes a first memory selection line $SEL_a$, a second memory selection line $SEL_b$, a third memory selection line $SEL_c$, and a fourth memory selection line SELL The first memory selection line $SEL_a$ is electrically coupled to the first memory 51 of corresponding one of the rows, the second memory selection line $SEL_b$ is electrically coupled to the second memory 52 thereof, the third memory selection line $SEL_c$ is electrically coupled to the third memory 53 thereof, and the fourth memory selection line $SEL_d$ is electrically coupled to the fourth memory 54 thereof. Each of the M memory selection line groups $SL_1$, $SL_2$, . . . extends along the X-direction in the display area DA (refer to FIG. 1).

When the control signal $Sig_3$ indicates a first value, the switch $SW_3$ electrically couples an output terminal of the latch 72 to the first memory selection line $SEL_a$ of each of the M memory selection line groups $SL_1$, $SL_2$, . . . . When the control signal $Sig_3$ indicates a second value, the switch $SW_3$ electrically couples the output terminal of the latch 72 to the second memory selection line $SEL_b$ of each of the M memory selection line groups $SL_1$, $SL_2$, . . . . When the control signal $Sig_3$ indicates a third value, the switch $SW_3$ electrically couples the output terminal of the latch 72 to the third memory selection line $SEL_c$ of each of the M memory selection line groups $SL_1$, $SL_2$, . . . .

The following describes a case of displaying a monochrome image, that is, a case of reading image data from the fourth memory 54 of each the pixels SPix. In this case, the timing controller 4b outputs a display switch signal $Sig_8$ at a low level to the inverter 73. The inverter 73 outputs a high-level signal to the fourth memory selection line $SEL_d$ of each of the M memory selection line groups $SL_1$, $SL_2$, . . . .

The following describes a case of not displaying any monochrome image, that is, a case of not reading image data from the fourth memory 54 of each the pixels SPix. In this case, the timing controller 4b outputs the display switch signal $Sig_8$ at a high level to the inverter 73. The inverter 73 outputs a low-level signal to the fourth memory selection line $SEL_d$ of each of the M memory selection line groups $SL_1$, $SL_2$, . . . .

Each of the pixels SPix modulates the liquid crystal layer based on the sub-pixel data being stored in one of the first to fourth memories 51 to 54 corresponding to the memory selection line SEL supplied with the memory selection signal. As a result, an image (frame) is displayed on the display surface.

M display signal lines $FRP_1$, $FRP_2$, . . . are arranged corresponding to the M rows of the pixels SPix on the first panel 2. Each of the M display signal lines $FRP_1$, $FRP_2$, . . . extends in the X-direction in the display area DA (refer to FIG. 1). If the inversion switch 71 is operated by the display signal and an inverted display signal obtained by inverting the display signal, the display signal line FRP and a second display signal line xFRP are provided for each of the rows.

The one or two display signal lines arranged for each of the rows correspond to a display signal line.

The inversion drive circuit 7 includes a switch $SW_1$. The switch $SW_1$ is controlled by a control signal $Sig_1$ supplied from the timing controller 4b. When the control signal $Sig_1$ indicates a first value, the switch $SW_1$ supplies the second selected clock signal $CLK-SEL_2$ to each of the display signal lines $FRP_1$, $FRP_2$, . . . . This operation causes the potential of the pixel electrode 15 to be inverted in synchronization with the second selected clock signal $CLK-SEL_2$. When the control signal $Sig_1$ indicates a second value, the switch $SW_1$ supplies a reference potential (ground potential) GND to each of the display signal lines $FRP_1$, $FRP_2$, . . . .

Figure 8:
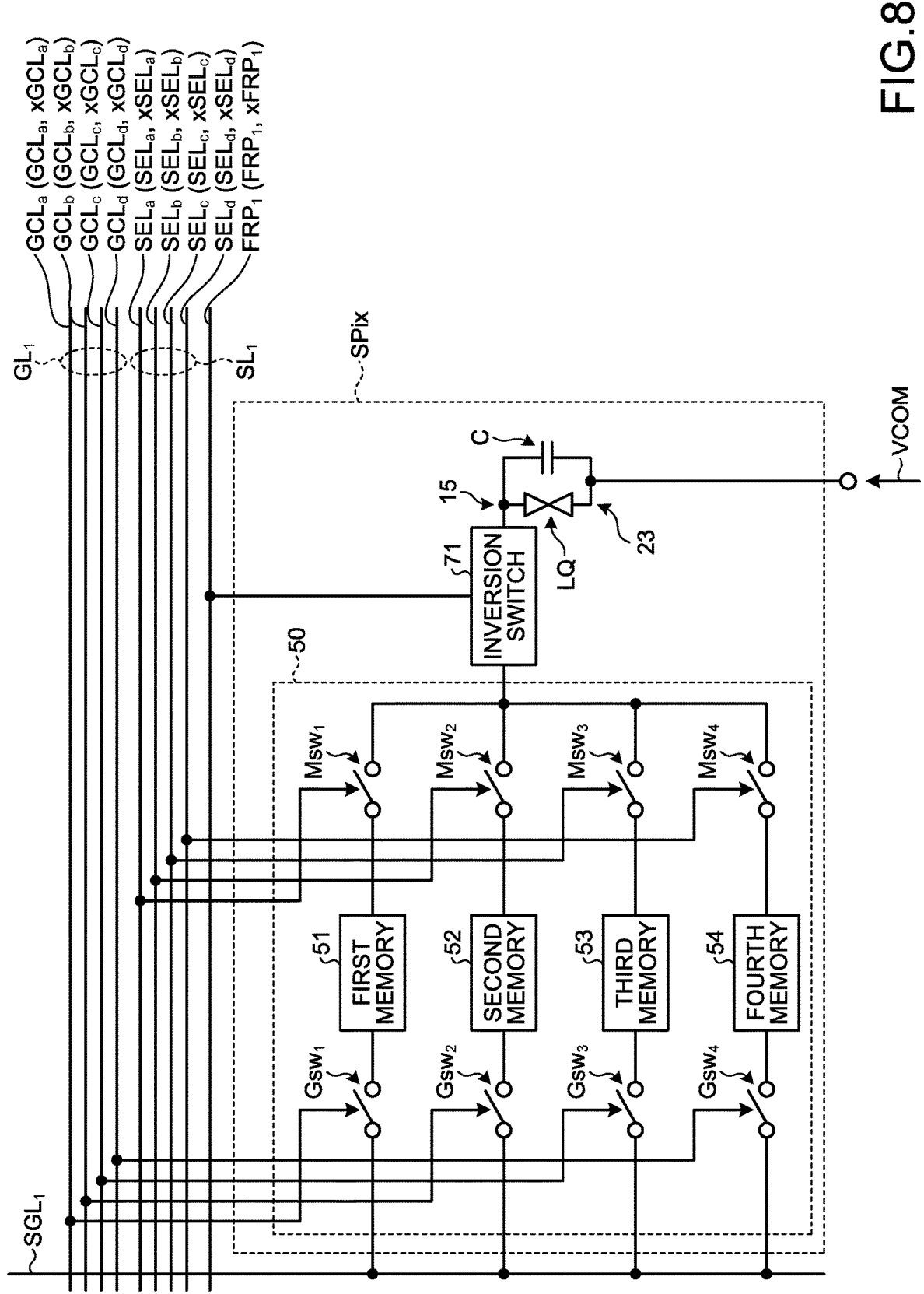
FIG. 8 is a diagram illustrating a circuit configuration of the pixel of the display device according to the first embodiment.

FIG. 8 is a diagram illustrating a circuit configuration of each of the pixels of the display device according to the first embodiment. FIG. 8 illustrates one of the pixels SPix.

The pixel SPix includes the memory block 50. The memory block 50 includes the first to fourth memories 51 to 54, switches $G_{SW1}$ to $G_{SW4}$, and switches $M_{SW1}$ to $M_{SW4}$.

A control input terminal of the switch $G_{SW1}$ is electrically coupled to the first gate line $GCL_a$. Supplying the gate signal at a high level to the first gate line $GCL_a$ turns on the switch $G_{SW1}$ to electrically couple the source line $SGL_1$ to an input terminal of the first memory 51. This operation stores the sub-pixel data supplied to the source line $SGL_1$ into the first memory 51.

A control input terminal of the switch $G_{SW2}$ is electrically coupled to the second gate line $GCL_b$. Supplying the high-level gate signal to the second gate line $GCL_b$ turns on the switch $G_{SW2}$ to electrically couple the source line $SGL_1$ to an input terminal of the second memory 52. This operation stores the sub-pixel data supplied to the source line $SGL_1$ into the second memory 52.

A control input terminal of the switch $G_{SW3}$ is electrically coupled to the third gate line $GCL_c$. Supplying the high-level gate signal to the third gate line $GCL_c$ turns on the switch $G_{SW3}$ to electrically couple the source line $SGL_1$ to an input terminal of the third memory 53. This operation stores the sub-pixel data supplied to the source line $SGL_1$ into the third memory 53.

A control input terminal of the switch $G_{SW4}$ is electrically coupled to the fourth gate line $GCL_d$. Supplying the high-level gate signal to the fourth gate line $GCL_d$ turns on the switch $G_{SW4}$ to electrically couple the source line $SGL_1$ to an input terminal of the fourth memory 54. This operation stores the sub-pixel data supplied to the source line $SGL_1$ into the fourth memory 54.

If the switches $G_{SW1}$ to $G_{SW4}$ are operated by the high-level gate signal, the gate line group $GL_1$ includes the first to fourth gate lines $GCL_a$ to $GCL_d$, as illustrated in FIG. 8. Examples of the switches operated by the high-level gate signal include n-channel transistors, but the present disclosure is not limited thereto.

If, instead, the switches $G_{SW1}$ to $G_{SW4}$ are operated by the gate signal and the inverted gate signal obtained by inverting the gate signal, the gate line group $GL_1$ further includes fifth to eighth gate lines $xGCL_a$ to $xGCL_d$ capable of being supplied with the inverted gate signal, in addition to the first to fourth gate lines $GCL_a$ to $GCL_d$. Examples of the switches operated by the gate signal and the inverted gate signal include transfer gates, but the present disclosure is not limited thereto.

The inverted gate signal can be supplied to the fifth gate line $xGCL_a$ by providing an inverter circuit having an input terminal electrically coupled to the first gate line $GCL_a$ and an output terminal electrically coupled to the fifth gate line $xGCL_a$. In the same manner, the inverted gate signal can be supplied to the sixth gate line $xGCL_b$ by providing an inverter circuit having an input terminal electrically coupled to the second gate line $GCL_b$ and an output terminal electrically coupled to the sixth gate line $xGCL_b$. In the same manner, the inverted gate signal can be supplied to the seventh gate line $xGCL_c$ by providing an inverter circuit having an input terminal electrically coupled to the third gate line $GCL_c$ and an output terminal electrically coupled to the seventh gate line $xGCL_c$. In the same manner, the inverted gate signal can be supplied to the eighth gate line $xGCL_d$ by providing an inverter circuit having an input terminal electrically coupled to the fourth gate line $GCL_d$ and an output terminal electrically coupled to the eighth gate line $xGCL_d$.

A control input terminal of the switch $M_{SW1}$ is electrically coupled to the first memory selection line $SEL_a$. Supplying the memory selection signal at a high level to the first memory selection line $SEL_a$ turns on the switch $M_{SW1}$ to electrically couple an output terminal of the first memory 51 to an input terminal of the inversion switch 71. This causes the sub-pixel data being stored in the first memory 51 to be supplied to the inversion switch 71.

A control input terminal of the switch $M_{SW2}$ is electrically coupled to the second memory selection line $SEL_b$. Supplying the high-level memory selection signal to the second memory selection line $SEL_b$ turns on the switch $M_{SW2}$ to electrically couple an output terminal of the second memory 52 to the input terminal of the inversion switch 71. This causes the sub-pixel data being stored in the second memory 52 to be supplied to the inversion switch 71.

A control input terminal of the switch $M_{SW3}$ is electrically coupled to the third memory selection line $SEL_c$. Supplying the high-level memory selection signal to the third memory selection line $SEL_c$ turns on the switch $M_{SW3}$ to electrically couple an output terminal of the third memory 53 to the input terminal of the inversion switch 71. This causes the sub-pixel data being stored in the third memory 53 to be supplied to the inversion switch 71.

A control input terminal of the switch $M_{SW4}$ is electrically coupled to the fourth memory selection line $SEL_d$. Supplying the high-level memory selection signal to the fourth memory selection line $SEL_d$ turns on the switch $M_{SW4}$ to electrically couple an output terminal of the fourth memory 54 to the input terminal of the inversion switch 71. This causes the sub-pixel data being stored in the fourth memory 54 to be supplied to the inversion switch 71.

If the switches $M_{SW1}$ to $M_{SW4}$ are operated by the high-level memory selection signal, the memory selection line group $SL_1$ includes the first to fourth memory selection lines $SEL_a$ to $SEL_d$, as illustrated in FIG. 8. Examples of the switches operated by the high-level memory selection signal include n-channel transistors, but the present disclosure is not limited thereto.

If, instead, the switches $M_{SW1}$ to $M_{SW4}$ are operated by the memory selection signal and the inverted memory selection signal obtained by inverting the memory selection signal, the memory selection line group $SL_1$ further includes the fifth to eighth memory selection lines $xSEL_a$ to $xSEL_d$ capable of being supplied with the inverted memory selection signal, in addition to the first to fourth memory selection lines $SEL_a$ to $SEL_d$. Examples of the switches operated by the memory selection signal and the inverted memory selection signal include transfer gates, but the present disclosure is not limited thereto.

The inverted memory selection signal can be supplied to the fifth memory selection line $xSEL_a$ by providing an inverter circuit having an input terminal electrically coupled to the first memory selection line $SEL_a$ and an output terminal electrically coupled to the fifth memory selection line $xSEL_a$. In the same manner, the inverted memory selection signal can be supplied to the sixth memory selection line $xSEL_b$ by providing an inverter circuit having an input terminal electrically coupled to the second memory selection line $SEL_b$ and an output terminal electrically coupled to the sixth memory selection line $xSEL_b$. In the same manner, the inverted memory selection signal can be supplied to the seventh memory selection line $xSEL_c$ by providing an inverter circuit having an input terminal electrically coupled to the third memory selection line $SEL_c$ and an output terminal electrically coupled to the seventh memory selection line $xSEL_c$. In the same manner, the inverted memory selection signal can be supplied to the eighth memory selection line $xSEL_d$ by providing an inverter circuit having an input terminal electrically coupled to the fourth memory selection line $SEL_d$ and an output terminal electrically coupled to the eighth memory selection line $xSEL_d$.

The display signal line $FRP_1$ supplies the inversion switch 71 with the display signal inverted in synchronization with the second selected clock signal $CLK-SEL_2$. Based on the sub-pixel data being stored in the first memory 51, the second memory 52, the third memory 53, or the fourth memory 54, the inversion switch 71 supplies the display signal unchanged or in an inverted form to the pixel electrode 15. The liquid crystal LQ and the retention capacitor C are provided between the pixel electrode 15 and the common electrode 23. The retention capacitor C retains the voltage between the pixel electrode 15 and the common electrode 23. The orientation of the molecules in the liquid crystal LQ changes according to the voltage between the pixel electrode 15 and the common electrode 23, and a pixel image is displayed.

If the inversion switch 71 is operated by the display signal, one display signal line $FRP_1$ is provided as illustrated in FIG. 8. If, instead, the inversion switch 71 is operated by the display signal and the inverted display signal obtained by inverting the display signal, the second display signal line $xFRP_1$ is further provided in addition to the display signal line $FRP_1$. The inverted display signal can be supplied to the second display signal line $xFRP_1$ by providing an inverter circuit having an input terminal electrically coupled to the display signal line $FRP_1$ and an output terminal electrically coupled to the second display signal line $xFRP_1$.

Figure 9:
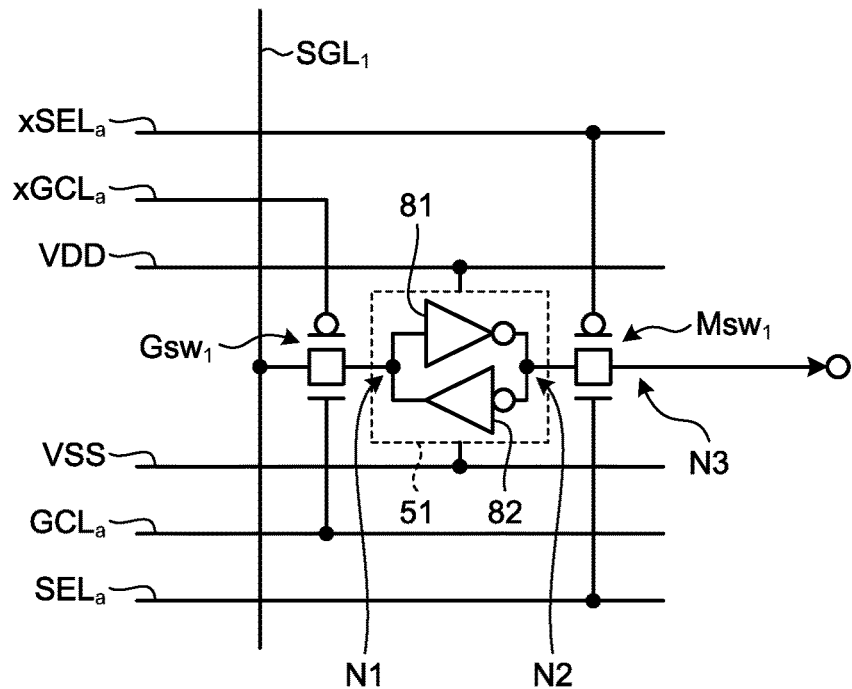
FIG. 9 is a diagram illustrating a circuit configuration of a memory of the pixel of the display device according to the first embodiment.

FIG. 9 is a diagram illustrating a circuit configuration of one of the memories in the pixel of the display device according to the first embodiment. FIG. 9 is a diagram illustrating the circuit configuration of the first memory 51. The circuit configuration of each of the second to fourth memories 52 to 54 is the same as that of the first memory 51, and is therefore neither illustrated nor described.

The first memory 51 has a static random access memory (SRAM) cell structure that includes an inverter circuit 81 and an inverter circuit 82 electrically coupled in parallel in a direction opposite to the inverter circuit 81. An input terminal of the inverter circuit 81 and an output terminal of the inverter circuit 82 constitute a node N1, and an output terminal of the inverter circuit 81 and an input terminal of the inverter circuit 82 constitute a node N2. The inverter circuit 81 and the inverter circuit 82 operate using power supplied from a power supply line VDD on a high-potential side and a power supply line VSS on a low-potential side.

The node N1 is electrically coupled to an output terminal of the switch $G_{SW1}$. The node N2 is electrically coupled to an input terminal of the switch $M_{SW1}$.

FIG. 9 illustrates an example in which a transfer gate is used as the switch $G_{SW1}$. One control input terminal of the switch $G_{SW1}$ is electrically coupled to the first gate line $GCL_a$. The other control input terminal of the switch $G_{SW1}$ is electrically coupled to the fifth gate line $xGCL_a$. The fifth gate line $xGCL_a$ is supplied with the inverted gate signal obtained by inverting the gate signal supplied to the first gate line $GCL_a$.

An input terminal of the switch $G_{SW1}$ is electrically coupled to the source line $SGL_1$. The output terminal of the switch $G_{SW1}$ is electrically coupled to the node N1. When the gate signal supplied to the first gate line $GCL_a$ is set to the high level and the inverted gate signal supplied to the fifth gate line $xGCL_a$ is set to the low level, the switch $G_{SW1}$ is turned on to electrically couple the source line $SGL_1$ to the node N1. This operation stores the sub-pixel data supplied to the source line $SGL_1$ into the first memory 51.

FIG. 9 illustrates an example in which a transfer gate is used as the switch $M_{SW1}$. One control input terminal of the switch $M_{SW1}$ is electrically coupled to the first memory selection line $SEL_a$. The other control input terminal of the switch $M_{SW1}$ is electrically coupled to the fifth memory selection line $xSEL_a$. The fifth memory selection line $xSEL_a$ is supplied with the inverted memory selection signal obtained by inverting the memory selection signal supplied to the first memory selection line $SEL_a$.

The input terminal of the switch $M_{SW1}$ is electrically coupled to the node N2. An output terminal of the switch $M_{SW1}$ is coupled to a node N3. The node N3 is an output node of the first memory 51, and is electrically coupled to the inversion switch 71 (refer to FIG. 8). When the memory selection signal supplied to the first memory selection line $SEL_a$ is set to the high level and the inverted memory selection signal supplied to the fifth memory selection line $xSEL_a$ is set to the low level, the switch $M_{SW1}$ is turned on. This operation electrically couples the node N2 to the input terminal of the inversion switch 71 through the switch $M_{SW1}$ and the node N3. This operation, in turn, supplies the sub-pixel data being stored in the first memory 51 to the inversion switch 71.

When both the switches $G_{SW1}$ and $M_{SW1}$ are off, the sub-pixel data circulates in a loop formed by the inverter circuits 81 and 82. Consequently, the first memory 51 continues retaining the sub-pixel data.

In the first embodiment, the exemplary case has been described where the first memory 51 is an SRAM. However, the present disclosure is not limited thereto. Other examples of the first memory 51 include a dynamic random access memory (DRAM).

Figure 10:
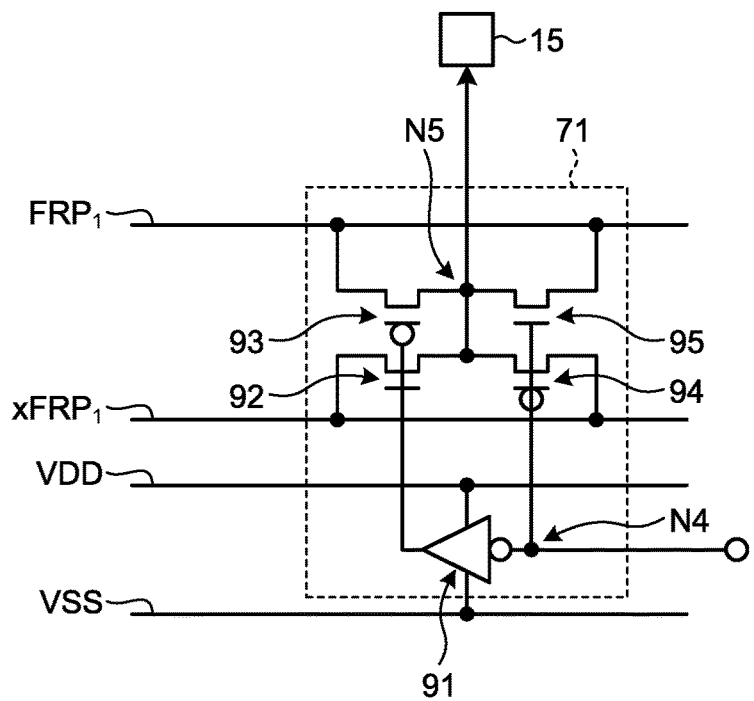
FIG. 10 is a diagram illustrating a circuit configuration of an inversion switch of the pixel of the display device according to the first embodiment.

FIG. 10 is a diagram illustrating a circuit configuration of the inversion switch of the pixel of the display device according to the first embodiment. The inversion switch 71 includes an inverter circuit 91, n-channel transistors 92 and 95, and p-channel transistors 93 and 94.

An input terminal of the inverter circuit 91, a gate terminal of the p-channel transistor 94, and a gate terminal of the n-channel transistor 95 are coupled to a node N4. The node N4 is an input node of the inversion switch 71 and is electrically coupled to the node N3 of the first to fourth memories 51 to 54. The node N4 is supplied with the sub-pixel data from the first memory 51, the second memory 52, the third memory 53, or the fourth memory 54. The inverter circuit 91 operates using power supplied from the power supply line VDD on the high-potential side and the power supply line VSS on the low-potential side.

One of the source and the drain of the n-channel transistor 92 is electrically coupled to the second display signal line $xFRP_1$. The other of the source and the drain of the n-channel transistor 92 is electrically coupled to a node N5.

One of the source and the drain of the p-channel transistor 93 is electrically coupled to the display signal line $FRP_1$. The other of the source and the drain of the p-channel transistor 93 is electrically coupled to the node N5.

One of the source and the drain of the p-channel transistor 94 is electrically coupled to the second display signal line $xFRP_1$. The other of the source and the drain of the p-channel transistor 94 is electrically coupled to the node N5.

One of the source and the drain of the n-channel transistor 95 is electrically coupled to the display signal line $FRP_1$. The other of the source and the drain of the n-channel transistor 95 is electrically coupled to the node N5.

The node N5 is an output node of the inversion switch 71 and is electrically coupled to the pixel electrode 15.

When the sub-pixel data supplied from the first memory 51, the second memory 52, the third memory 53, or the fourth memory 54 is at the high level, the output signal of the inverter circuit 91 is at the low level. When the output signal of the inverter circuit 91 is at the low level, the n-channel transistor 92 is off, and the p-channel transistor 93 is on.

When the sub-pixel data supplied from the first memory 51, the second memory 52, the third memory 53, or the fourth memory 54 is at the high level, the p-channel transistor 94 is off, and the n-channel transistor 95 is on.

Thus, when the sub-pixel data supplied from the first memory 51, the second memory 52, the third memory 53, or the fourth memory 54 is at the high level, the display signal supplied to the display signal line $FRP_1$ is supplied to the pixel electrode 15 through the p-channel transistor 93 and the n-channel transistor 95.

The display signal supplied to the display signal line $FRP_1$ is inverted in synchronization with the second selected clock signal $CLK\text{-}SEL_2$. The common potential supplied to the common electrode 23 is also inverted in phase with the display signal in synchronization with the second selected clock signal $CLK\text{-}SEL_2$. When the display signal is in phase with the common potential, no voltage is applied to the liquid crystal LQ, so that the orientation of the liquid crystal molecules does not change. As a result, the pixel is placed in a black display state (a state of not transmitting the reflected light). Thus, the display device 1 can use the common inversion driving method.

When the sub-pixel data supplied from the first memory 51, the second memory 52, the third memory 53, or the fourth memory 54 is at the low level, the output signal of the inverter circuit 91 is at the high level. When the output signal of the inverter circuit 91 is at the high level, the n-channel transistor 92 is on, and the p-channel transistor 93 is off.

When the sub-pixel data supplied from the first memory 51, the second memory 52, the third memory 53, or the fourth memory 54 is at the low level, the p-channel transistor 94 is on, and the n-channel transistor 95 is off.

Thus, when the sub-pixel data supplied from the first memory 51, the second memory 52, the third memory 53, or the fourth memory 54 is at the low level, the inverted display signal supplied to the second display signal line xFRP$_1$ is supplied to the pixel electrode 15 through the n-channel transistor 92 and the p-channel transistor 94.

The inverted display signal supplied to the second display signal line xFRP$_1$ is inverted in synchronization with the second selected clock signal CLK-SEL$_2$. The common potential supplied to the common electrode 23 is inverted out of phase with the display signal in synchronization with the second selected clock signal CLK-SEL$_2$. When the display signal is out of phase with the common potential, a voltage is applied to the liquid crystal LQ, so that the orientation of the liquid crystal molecules changes. As a result, the pixel is placed in a white display state (a state of transmitting the reflected light). Thus, the display device 1 can use the common inversion driving method.

1-4. First Operation Example

Figure 11:
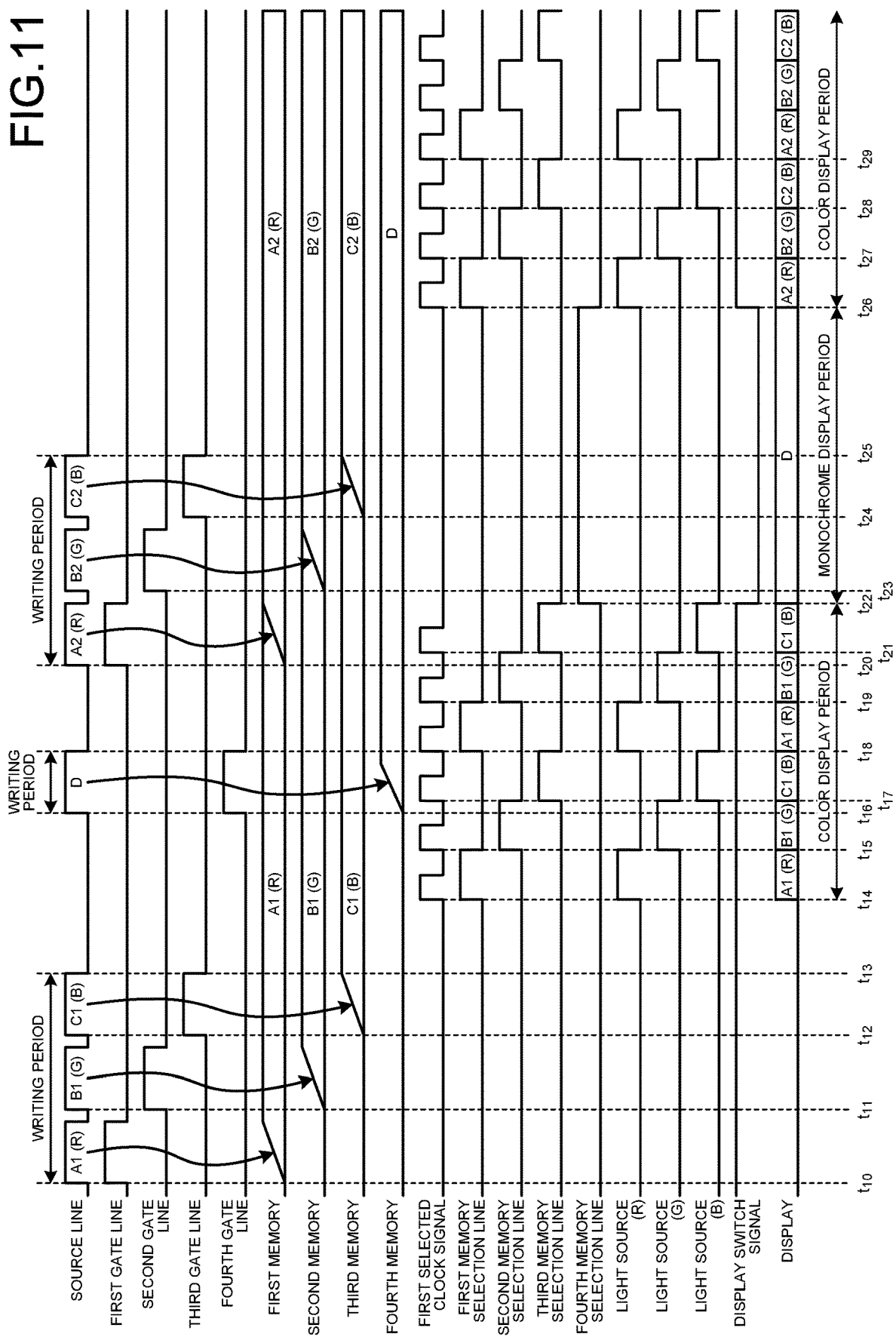
FIG. 11 is a timing chart of operation timing of the display device according to the first embodiment.

FIG. 11 is a timing chart of operation timing of the display device according to the first embodiment. FIG. 12 is a diagram illustrating the image sequentially displayed in the display device according to the first embodiment.

Through the entire period of time illustrated in FIG. 11, the timing controller 4b outputs, to the first selector 32-1, the control signal Sig$_6$ for selecting the second frequency-divided clock signal CLK-X$_1$ based on the value of the setting register 4c. This operation causes the first selector 32-1 to select the second frequency-divided clock signal CLK-X$_1$ as the first selected clock signal CLK-SEL$_1$. Consequently, the frequency of the first selected clock signal CLK-SEL$_1$ is ½ times the frequency of the reference clock signal CLK. The first selector 32-1 outputs the first selected clock signal CLK-SEL$_1$ to the memory selection circuit 8 and the light source selection circuit 33.

The timing controller 4b outputs, to the second selector 32-2, the control signal Sig$_7$ for selecting the fourth frequency-divided clock signal CLK-X$_3$ based on the value of the setting register 4c. This operation causes the second selector 32-2 to select the fourth frequency-divided clock signal CLK-X$_3$ as the second selected clock signal CLK-SEL$_2$. Consequently, the frequency of the second selected clock signal CLK-SEL$_2$ is ⅛ times the frequency of the reference clock signal CLK. The second selector 32-2 outputs the second selected clock signal CLK-SEL$_2$ to the common electrode drive circuit 6 and the inversion drive circuit 7. The common electrode drive circuit 6 supplies, to the common electrode 23, the common potential that is inverted in synchronization with the second selected clock signal CLK-SEL$_2$.

A time period from time $t_{10}$ to time $t_{13}$ is a writing period of writing the sub-pixel data to the first to third memories 51 to 53 of each of the pixels SPix.

At time $t_{10}$, the timing controller 4b outputs the control signal Sig$_5$ having the first value to the switches SW$_4$ in the gate line selection circuit 10. The switches SW$_4$ electrically couple the output terminals of the gate line drive circuit 9 to the first gate lines GCL$_a$. The gate line drive circuit 9 outputs the gate signal to each of the first gate lines GCL$_a$. When the high-level gate signal is supplied to the first gate line GCL$_a$, the first memory 51 of each of the pixels SPix belonging to a corresponding one of the rows is selected as a writing destination of the sub-pixel data.

At time $t_{10}$, the source line drive circuit 5 outputs pixel data of a row constituting image data A1(R) to the source lines SGL. As a result, the pixel data of the row constituting the image data A1(R) is written to the first memories 51 of the pixels SPix belonging to the row.

This operation is performed in a line-sequential manner for the first to M-th lines over a time period from time $t_{10}$ to time $t_{11}$. As a result, the image data A1(R) is written and saved into the first memories 51 of all the pixels SPix.

The same operation as the above is performed in relation to the second gate lines GCL$_b$ and image data B1(G) over a time period from time $t_{11}$ to time $t_{12}$. As a result, the image data B1(G) is written and saved into the second memories 52 of all the pixels SPix.

The same operation as the above is performed in relation to the third gate lines GCL$_c$ and image data C1(B) over a time period from time $t_{12}$ to time $t_{13}$. As a result, the image data C1(B) is written and saved into the third memories 53 of all the pixels SPix.

A time period from time $t_{14}$ to time $t_{22}$ is a color display (color still image display) period of displaying three images (frames) based on the three pieces of image data A1(R), B1(G), and C1(B) in a sequentially switching manner.

At time $t_{14}$, the timing controller 4b outputs the control signal Sig$_2$ having the first value to the switch SW$_2$ in the memory selection circuit 8. The switch SW$_2$ is turned on in accordance with the control signal Sig$_2$ having the first value supplied from the timing controller 4b. This operation causes the first selected clock signal CLK-SEL$_1$ to be supplied to the latch 72.

At time $t_{14}$, the timing controller 4b outputs the control signal Sig$_3$ having the first value to the switch SW$_3$ in the memory selection circuit 8. The switch SW$_3$ electrically couples the output terminal of the latch 72 to the first memory selection line SEL$_a$ of each of the M memory selection line groups SL$_1$, SL$_2$, . . . . This operation causes the memory selection signal to be supplied to the first memory selection line SEL$_a$ of each of the M memory selection line groups SL$_1$, SL$_2$, . . . .

The first memories 51 coupled to their respective first memory selection lines SEL$_a$ output the pixel data constituting the image data A1(R) to their corresponding inversion switches 71. This operation causes the display device 1 to display the image based on the image data A1(R) at time $t_{14}$.

At time $t_{14}$, the timing controller 4b controls the light source selection circuit 33 so as to select the light source 35$_R$. The light source selection circuit 33 controls the light source drive circuit 34 so as to drive the light source 35$_R$. The light source drive circuit 34 outputs the drive current to the light source 35$_R$. This operation causes the light source 35$_R$ to emit light in red (R) to the light guide plate 36. The light in red (R) emitted to the light guide plate 36 is directed toward the pixel electrode 15. The light in red (R) reflected by the pixel electrode 15 reaches the eyes of the viewer.

Referring to FIG. 12, at time $t_{14}$, all the pixels SPix display the image based on the image data A1(R). The light source $35_R$ emits the light in red (R). As a result, the display device 1 displays a red image IM1(R) obtained by irradiating the image based on the image data A1(R) with the light in red (R). The red image IM1(R) reaches the eyes of the viewer.

Referring again to FIG. 11, at time $t_{15}$, the timing controller 4b outputs the control signal $Sig_3$ having the second value to the switch $SW_3$ in the memory selection circuit 8. The switch $SW_3$ electrically couples the output terminal of the latch 72 to the second memory selection line $SEL_b$ of each of the M memory selection line groups $SL_1$, $SL_2$, .... This operation causes the memory selection signal to be supplied to the second memory selection line $SEL_b$ of each of the M memory selection line groups $SL_1$, $SL_2$, ....

The second memories 52 coupled to their respective second memory selection lines $SEL_b$ output the pixel data constituting the image data B1(G) to their corresponding inversion switches 71. This operation causes the display device 1 to display the image based on the image data B1(G) at time $t_{15}$.

At time $t_{15}$, the timing controller 4b controls the light source selection circuit 33 so as to select the light source $35_G$. The light source selection circuit 33 controls the light source drive circuit 34 so as to drive the light source $35_G$. The light source drive circuit 34 outputs the drive current to the light source $35_G$. This operation causes the light source $35_G$ to emit light in green (G) to the light guide plate 36. The light in green (G) emitted to the light guide plate 36 is directed toward the pixel electrode 15. The light in green (G) reflected by the pixel electrode 15 reaches the eyes of the viewer.

Referring again to FIG. 12, at time $t_{15}$, all the pixels SPix display the image based on the image data B1(G). The light source $35_G$ emits the light in green (G). As a result, the display device 1 displays a green image IM1(G) obtained by irradiating the image based on the image data B1(G) with the light in green (G). The green image IM1(G) reaches the eyes of the viewer.

Referring again to FIG. 11, at time $t_{17}$, the timing controller 4b outputs the control signal $Sig_3$ having the third value to the switch $SW_3$ in the memory selection circuit 8. The switch $SW_3$ electrically couples the output terminal of the latch 72 to the third memory selection line $SEL_c$ of each of the M memory selection line groups $SL_1$, $SL_2$, .... This operation causes the memory selection signal to be supplied to the third memory selection line $SEL_c$ of each of the M memory selection line groups $SL_1$, $SL_2$, ....

The third memories 53 coupled to their respective third memory selection lines $SEL_c$ output the pixel data constituting the image data C1(B) to the corresponding inversion switches 71. This operation causes the display device 1 to display the image based on the image data C1(B) at time $t_{17}$.

At time $t_{17}$, the timing controller 4b controls the light source selection circuit 33 so as to select the light source $35_B$. The light source selection circuit 33 controls the light source drive circuit 34 so as to drive the light source $35_B$. The light source drive circuit 34 outputs the drive current to the light source $35_B$. This operation causes the light source $35_B$ to emit light in blue (B) to the light guide plate 36. The light in blue (B) emitted to the light guide plate 36 is directed toward the pixel electrode 15. The light in blue (B) reflected by the pixel electrode 15 reaches the eyes of the viewer.

Referring again to FIG. 12, at time $t_{17}$, all the pixels SPix display the image based on the image data C1(B). The light source $35_B$ emits the light in blue (B). As a result, the display device 1 displays a blue image IM1(B) obtained by irradiating the image based on the image data C1(B) with the light in blue (B). The blue image IM1(B) reaches the eyes of the viewer.

In this manner, from time $t_{14}$ to time $t_{17}$, the display device 1 sequentially displays the images IM1(R), IM1(G), and IM1(B). Thus, the viewer can visually recognize a color image IM1 in which the colors of the images IM1(R), IM1(G), and IM1(B) are mixed.

Referring again to FIG. 11, from time $t_{16}$ to time $t_{18}$, the image data is written to the fourth memories 54 of all the pixels SPix. From time $t_{16}$ to time $t_{17}$, the images IM1(G) and IM1(B) based on the image data being stored in the second and third memories 52 and 53 of all the pixels SPix are displayed; however, the fourth memories 54 are not referred to. Thus, from time $t_{16}$ to time $t_{18}$, the image data can be written to the fourth memories 54.

At time $t_{16}$, the timing controller 4b outputs the control signal $Sig_5$ having the fourth value to the switches $SW_4$ in the gate line selection circuit 10. The switches $SW_4$ electrically couple the output terminals of the gate line drive circuit 9 to the fourth gate lines $GCL_d$. The gate line drive circuit 9 outputs the gate signal to each of the fourth gate lines $GCL_d$. When the high-level gate signal is supplied to the fourth gate line $GCL_a$, the fourth memory 54 of each of the pixels SPix belonging to a corresponding one of the rows is selected as a writing destination of the sub-pixel data.

At time $t_{16}$, the source line drive circuit 5 outputs pixel data of a row constituting image data D to the source lines SGL. As a result, the pixel data of the row constituting the image data D is written to the fourth memories 54 of the pixels SPix belonging to the row.

This operation is performed in a line-sequential manner for the first to M-th lines over the time period from time $t_{16}$ to time $t_{18}$. As a result, the image D is written and saved into the fourth memories 54 of all the pixels SPix.

A color display operation from time $t_{18}$ to time $t_{22}$ is the same as the color display operation from time $t_{14}$ to time $t_{18}$, and therefore, will not be described.

During a time period from time $t_{14}$ to time $t_{22}$, the memories are referred to in the order of the first memory 51, the second memory 52, the third memory 53, the first memory 51, the second memory 52, and then the third memory 53. Accordingly, during the time period from time $t_{14}$ to time $t_{22}$, the display device 1 displays the images in the order of the image IM1(R), image IM1(G), the image IM1(B), the image IM1(R), the image IM1(G), and then the image IM1(B).

A time period from time $t_{22}$ to time $t_{26}$ is a monochrome display (monochrome still image display) period of displaying an image based on the image data D.

At time $t_{22}$, the timing controller 4b outputs the low-level display switch signal Sip to the inverter 73. The inverter 73 outputs the high-level signal to the fourth memory selection line $SEL_d$ of each of the M memory selection line groups $SL_1$, $SL_2$, .... This operation causes the memory selection signal to be supplied to the fourth memory selection line $SEL_d$ of each of the M memory selection line groups $SL_1$, $SL_2$, ....

The fourth memories 54 coupled to their respective fourth memory selection lines $SEL_d$ output the pixel data constituting the image data D to their corresponding inversion switches 71. This operation causes the display device 1 to display the image based on the image data D at time $t_{22}$.

At time $t_{22}$, the timing controller 4b controls the light source selection circuit 33 so as not to select any of the light sources $35_R$, $35_G$, and $35_B$. The light source selection circuit 33 controls the light source drive circuit 34 so as not to drive any of the light sources $35_R$, $35_G$, and $35_B$. The light source drive circuit 34 does not output the drive current to any of the light sources $35_R$, $35_G$, and $35_B$. As a result, none of the light sources $35_R$, $35_G$, and $35_B$ emits light. External light incident from the display surface 1a is reflected by the pixel electrode 15, and reaches the eyes of the viewer.

Referring again to FIG. 12, at time $t_{22}$, all the pixels SPix display the image based on the image data D. None of the light sources $35_R$, $35_G$, and $35_B$ emits light. As a result, the display device 1 displays a monochrome image IMm obtained by irradiating the image based on the image data D with the external light. The monochrome image IMm reaches the eyes of the viewer. Thus, the viewer can view the monochrome image IMm.

During a time period from time $t_{18}$ to time $t_{26}$, the memories are referred to in the order of the first memory 51, the second memory 52, the third memory 53, and then the fourth memory 54. Thus, during the time period from time $t_{18}$ to time $t_{26}$, the display device 1 displays the images in the order of the image IM1(R), the image IM1(G), the image IM1(B), and then the image IMm.

Referring again to FIG. 11, from time $t_{20}$ to time $t_{25}$, the image data is written to the first to third memories 51 to 53 of all the pixels SPix. From time $t_{20}$ to time $t_{22}$, the images IM1(G) and IM1(B) based on the image data B1(G) and C1(B) being stored in the second and third memories 52 and 53 of all the pixels SPix are displayed; however, the first memories 51 are not referred to. Thus, from time $t_{20}$ to time $t_{22}$, the image data can be written to the first memories 51.

From time $t_{22}$ to time $t_{25}$, the image IMm based on the image data D being stored in the fourth memories 54 of all the pixels SPix is displayed; however, the second and third memories 52 and 53 are not referred to. Thus, from time $t_{22}$ to time $t_{25}$, the image data can be written to the second and third memories 52 and 53.

At time $t_{20}$, the timing controller 4b outputs the control signal $Sig_5$ having the first value to the switches $SW_4$ in the gate line selection circuit 10. The switches $SW_4$ electrically couple the output terminals of the gate line drive circuit 9 to the first gate lines $GCL_a$. The gate line drive circuit 9 outputs the gate signal to each of the first gate lines $GCL_a$. When the high-level gate signal is supplied to the first gate line $GCL_a$, the first memory 51 of each of the pixels SPix belonging to corresponding one of the rows is selected as a writing destination of the sub-pixel data.

At time $t_{20}$, the source line drive circuit 5 outputs pixel data of a row constituting image data A2(R) to the source lines SGL. As a result, the pixel data of the row constituting the image data A2(R) is written to the first memories 51 of the respective pixels SPix belonging to the row.

This operation is performed in a line-sequential manner for the first to M-th lines over the time period from time $t_{20}$ to time $t_{23}$. As a result, the image data A2(R) is written and saved into the first memories 51 of all the pixels SPix.

The same operation as the above is performed in relation to the second gate lines $GCL_b$ and image data B2(G) over a time period from time $t_{23}$ to time $t_{24}$. As a result, the image data B2(G) is written and saved into the second memories 52 of all the pixels SPix.

The same operation as the above is performed in relation to the third gate lines $GCL_c$ and image data C2(B) over a time period from time $t_{24}$ to time $t_{25}$. As a result, the image data C2(B) is written and saved into the third memories 53 of all the pixels SPix.

A time period from time $t_{26}$ to time $t_{29}$ is the color display (color still image display) period of displaying three images (frames) based on the three pieces of image data A2(R), B2(G), and C2(B) in a sequentially switching manner.

At time $t_{26}$, the timing controller 4b outputs the control signal $Sig_2$ having the first value to the switch $SW_2$ in the memory selection circuit 8. The switch $SW_2$ is turned on in accordance with the control signal $Sig_2$ having the first value supplied from the timing controller 4b. This operation supplies the first selected clock signal $CLK\text{-}SEL_1$ to the latch 72.

At time $t_{26}$, the timing controller 4b outputs the control signal $Sig_3$ having the first value to the switch $SW_3$ in the memory selection circuit 8. The switch $SW_3$ electrically couples the output terminal of the latch 72 to the first memory selection line $SEL_a$ of each of the M memory selection line groups $SL_1$, $SL_2$, .... This operation causes the memory selection signal to be supplied to the first memory selection line $SEL_a$ of each of the M memory selection line groups $SL_1$, $SL_2$, ....

The first memories 51 coupled to their respective first memory selection lines $SEL_a$ output the pixel data constituting the image data A2(R) to their corresponding inversion switches 71. This operation causes the display device 1 to display the image based on the image data A2(R) at time $t_{26}$.

At time $t_{26}$, the timing controller 4b controls the light source selection circuit 33 so as to select the light source $35_R$. The light source selection circuit 33 controls the light source drive circuit 34 so as to drive the light source $35_R$. The light source drive circuit 34 outputs the drive current to the light source $35_R$. This operation causes the light source $35_R$ to emit light in red (R) to the light guide plate 36. The light in red (R) emitted to the light guide plate 36 is directed toward the pixel electrode 15. The light in red (R) reflected by the pixel electrode 15 reaches the eyes of the viewer.

As a result, the display device 1 displays a red (R) image obtained by irradiating the image based on the image data A2(R) with the light in red (R). The red (R) image reaches the eyes of the viewer.

At time $t_{27}$, the timing controller 4b outputs the control signal $Sig_3$ having the second value to the switch $SW_3$ in the memory selection circuit 8. The switch $SW_3$ electrically couples the output terminal of the latch 72 to the second memory selection line $SEL_b$ of each of the M memory selection line groups $SL_1$, $SL_2$, .... This operation causes the memory selection signal to be supplied to the second memory selection line $SEL_b$ of each of the M memory selection line groups $SL_1$, $SL_2$, ....

The second memories 52 coupled to their respective second memory selection lines $SEL_b$ output the pixel data constituting the image data B2(G) to their corresponding inversion switches 71. This operation causes the display device 1 to display the image based on the image data B2(G) at time $t_{27}$.

At time $t_{27}$, the timing controller 4b controls the light source selection circuit 33 so as to select the light source $35_G$. The light source selection circuit 33 controls the light source drive circuit 34 so as to drive the light source $35_G$. The light source drive circuit 34 outputs the drive current to the light source $35_G$. This operation causes the light source $35_G$ to emit light in green (G) to the light guide plate 36. The light in green (G) emitted to the light guide plate 36 is directed toward the pixel electrode 15. The light in green (G) reflected by the pixel electrode 15 reaches the eyes of the viewer.

As a result, the display device 1 displays a green (G) image obtained by irradiating the image based on the image data B2(G) with the light in green (G). The green (G) image reaches the eyes of the viewer.

At time $t_{28}$, the timing controller 4b outputs the control signal $Sig_3$ having the third value to the switch $SW_3$ in the memory selection circuit 8. The switch $SW_3$ electrically couples the output terminal of the latch 72 to the third memory selection line $SEL_c$ of each of the M memory selection line groups $SL_1$, $SL_2$, . . . . This operation causes the memory selection signal to be supplied to the third memory selection line $SEL_c$ of each of the M memory selection line groups $SL_1$, $SL_2$, . . . .

The third memories 53 coupled to their respective third memory selection lines $SEL_c$ output the pixel data constituting the image data C2(B) to their corresponding inversion switch 71. This operation causes the display device 1 to display the image based on the image data C2(B) at time $t_{28}$.

At time $t_{28}$, the timing controller 4b controls the light source selection circuit 33 so as to select the light source $35_B$. The light source selection circuit 33 controls the light source drive circuit 34 so as to drive the light source $35_B$. The light source drive circuit 34 outputs the drive current to the light source $35_B$. This operation causes the light source $35_B$ to emit light in blue (B) to the light guide plate 36. The light in blue (B) emitted to the light guide plate 36 is directed toward the pixel electrode 15. The light in blue (B) reflected by the pixel electrode 15 reaches the eyes of the viewer.

As a result, the display device 1 displays a blue (B) image obtained by irradiating the image based on the image data C2(B) with the light in blue (B). The blue (B) image reaches the eyes of the viewer.

In this manner, from time $t_{26}$ to time $t_{28}$, the display device 1 sequentially displays the red (R) image, the green (G) image, and the blue (B) image. Thus, the viewer can visually recognize a color image in which the colors of the red (R) image, the green (G) image, and the blue (B) image are mixed.

During a time period from time $t_{22}$ to time $t_{29}$, the memories are referred to in the order of the fourth memory 54, the first memory 51, the second memory 52, and then the third memory 53. Thus, during the time period from time $t_{22}$ to time $t_{29}$, the display device 1 displays the images in the order of an image Imm, an image IM2(R), an image IM2(G), and then an image IM2(B).

A color display operation from time $t_{29}$ onward is the same as the color display operation from time $t_{26}$ to time $t_{28}$, and therefore, will not be described.

The display device 1 can cause the light source $35_R$, $35_G$, or $35_B$ to emit light over the entire period of time (for example, from time $t_{14}$ to time $t_{15}$, or from time $t_{15}$ to time $t_{16}$) of displaying each color (red (R), green (G), or blue (B)) image. Thus, the display device 1 can cause the light source $35_R$, $35_G$, or $35_B$ to emit the light over the entire period of time (for example, from time $t_{14}$ to time $t_{18}$, or from time $t_{18}$ to time $t_{22}$) of displaying each color (red (R), green (G), or blue (B)) image. As a result, the display device 1 can restrain the luminance of the images from decreasing. Consequently, the display device 1 need not increase the luminance of the light sources. Therefore, the display device 1 can reduce the power consumption.

The display device 1 does not cause the light sources $35_R$, $35_G$, and $35_B$ to emit light over the entire period of time of displaying the monochrome image (for example, from time $t_{22}$ to time $t_{26}$). As a result, the display device 1 can reduce the power consumption while the monochrome image is displayed. Electronic shelf labels are exemplified as one application example of the display device 1. For the electronic shelf labels, a use mode can be considered in which product explanation is made using color images and price display is made using monochrome images. The display device 1 can reduce the power consumption in such a use mode.

In other words, the display device 1 can increase the luminance. This matter will be described below by way of comparison with comparative examples.

1-5. Comparative Examples

Figure 13A:
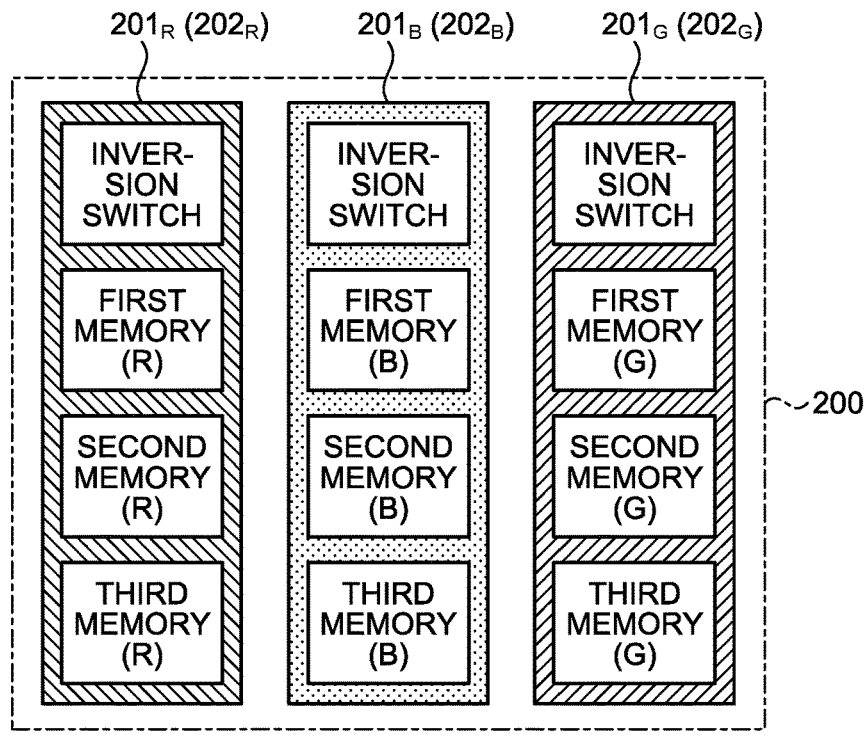
FIG. 13A is a diagram illustrating a pixel of a comparative example.
Figure 13B:
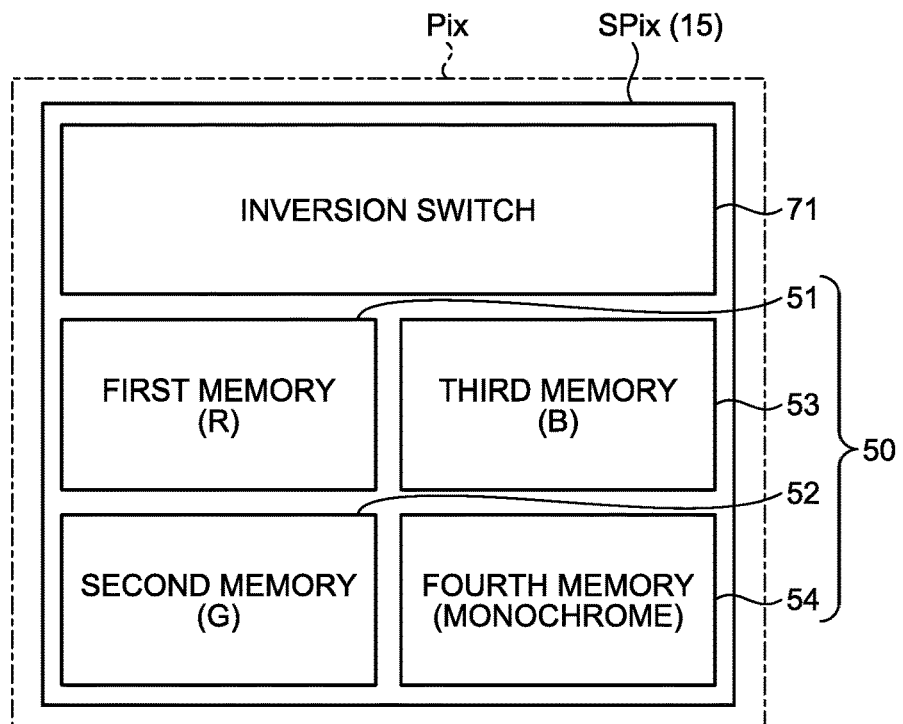
FIG. 13B is a diagram illustrating the pixel of the first embodiment.

FIG. 13A is a diagram illustrating a pixel of a comparative example. A pixel 200 includes a red (R) sub-pixel $201_R$ (sub-pixel electrode $202_R$), a blue (B) sub-pixel $201_B$ (sub-pixel electrode $202_B$), and a green (G) sub-pixel $201_G$ (sub-pixel electrode $202_G$). The area of each of the sub-pixel electrodes $202_R$, $202_B$, and $202_G$ is equal to or smaller than one third of the area of the pixel 200. This is because the pixel 200 includes the three sub-pixel electrodes $202_R$, $202_B$, and $202_G$, and needs to have a gap between the sub-pixel electrode $202_R$ and the sub-pixel electrode $202_B$ and a gap between the sub-pixel electrode $202_B$ and the sub-pixel electrode $202_G$. The pixel electrode 15 of the first embodiment is approximately equal in area to the pixel region Pix, as illustrated in FIG. 13B.

Thus, the display device 1 of the first embodiment can display each color (red (R), green (G), or blue (B)) image using a region that is substantially three or more times as large as that of the comparative example, and can therefore display the image at luminance higher than that of the comparative example.

Figure 14:
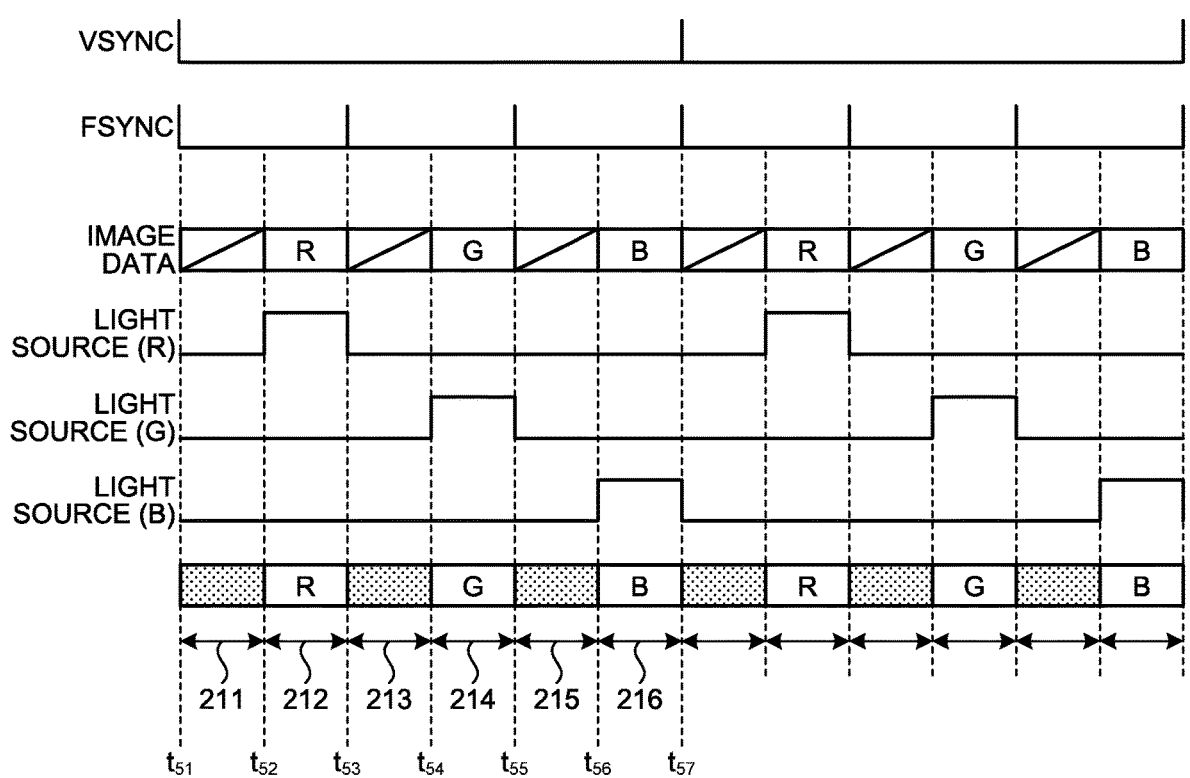
FIG. 14 is a timing chart of operation timing of another comparative example.

FIG. 14 is a timing chart of operation timing of another comparative example. Specifically, this comparative example includes a reflective pixel electrode having the same size as that of the example of the present application, and a pixel switch is turned on with a gate line to couple the pixel electrode to a signal line such that a pixel signal is written to the pixel electrode. While the size of the pixel electrode of the other comparative example illustrated in FIG. 14 is the same as that of the present embodiment as described above, the other comparative example requires a period of time for writing the pixel signal to each of the pixel electrodes. The following specifically describes driving of the other comparative example along FIG. 14. As illustrated in FIG. 14, one period of a vertical synchronizing signal VSYNC for the pixel electrodes includes three periods of a field synchronizing signal FSYNC. One period of the field synchronizing signal FSYNC includes a writing period and a display period of red (R), green (G), or blue (B) image data.

At time $t_{51}$ when the field synchronizing signal FSYNC is at a high level, red (R) image data starts to be written to the sub-pixels. At time $t_{52}$, the red (R) light source starts to emit light. A time period from time $t_{51}$ to time $t_{52}$ is a writing period 211 of the red (R) image data.

At time $t_{53}$ when the field synchronizing signal FSYNC is at the high level, the red (R) light source stops emitting the light. A time period from time $t_{52}$ to time $t_{53}$ is a red (R) image display period 212.

At time $t_{53}$ when the field synchronizing signal FSYNC is at the high level, green (G) image data starts to be written to the sub-pixels. At time $t_{54}$, the green (G) light source starts to emit light. A time period from time $t_{53}$ to time $t_{54}$ is a writing period 213 of the green (G) image data.

At time $t_{55}$ when the field synchronizing signal FSYNC is at the high level, the green (G) light source stops emitting the light. A time period from time $t_{54}$ to time $t_{55}$ is a green (G) image display period 214.

At time $t_{55}$ when the field synchronizing signal FSYNC is at the high level, blue (B) image data starts to be written to the sub-pixels. At time $t_{56}$, the blue (B) light source starts to emit light. A time period from time $t_{55}$ to time $t_{56}$ is a writing period 215 of the blue (B) image data.

At time $t_{57}$ when the field synchronizing signal FSYNC is at the high level, the blue (B) light source stops emitting the light. A time period from time $t_{56}$ to time $t_{57}$ is a blue (B) image display period 216.

In the comparative example, a time period corresponding to a substantially half of one period of the field synchronizing signal FSYNC is the writing period of the image data, and another time period corresponding to a substantially half thereof is the image display period.

In contrast, as illustrated in FIG. 11, the display device 1 of the first embodiment lights the red (R) light source $35_R$ and displays a red (R) image during the time period from time $t_{14}$ to time $t_{15}$; the display device 1 lights the green (G) light source $35_G$ and displays a green (G) image during a time period from time $t_{15}$ to time $t_{17}$; and the display device 1 lights the blue (B) light source $35_B$ and displays a blue (B) image during a time period from time $t_{17}$ to time $t_{18}$.

In other words, the display device 1 can display each color image (red (R), green (G), or blue (B) image) for a period of time substantially twice as long as that of the comparative example.

For the above reason, the display device 1 can display the image at luminance higher than that of the comparative example. If the area of the pixel SPix (pixel electrode 15) illustrated in FIG. 3 is the same as the area of each of the sub-pixel electrodes $202_R$, $202_G$, and $202_B$ illustrated in FIG. 13A, a substantially three times higher definition can be obtained.

1-6. Second Operation Example

As described in the first operation example, while the display device 1 is displaying an image based on image data being stored in one of the first to fourth memories 51 to 54, the display device 1 can store image data into another of the first to fourth memories 51 to 54. The display device 1 can use this feature to perform color animation display (color moving image display).

Figure 15:
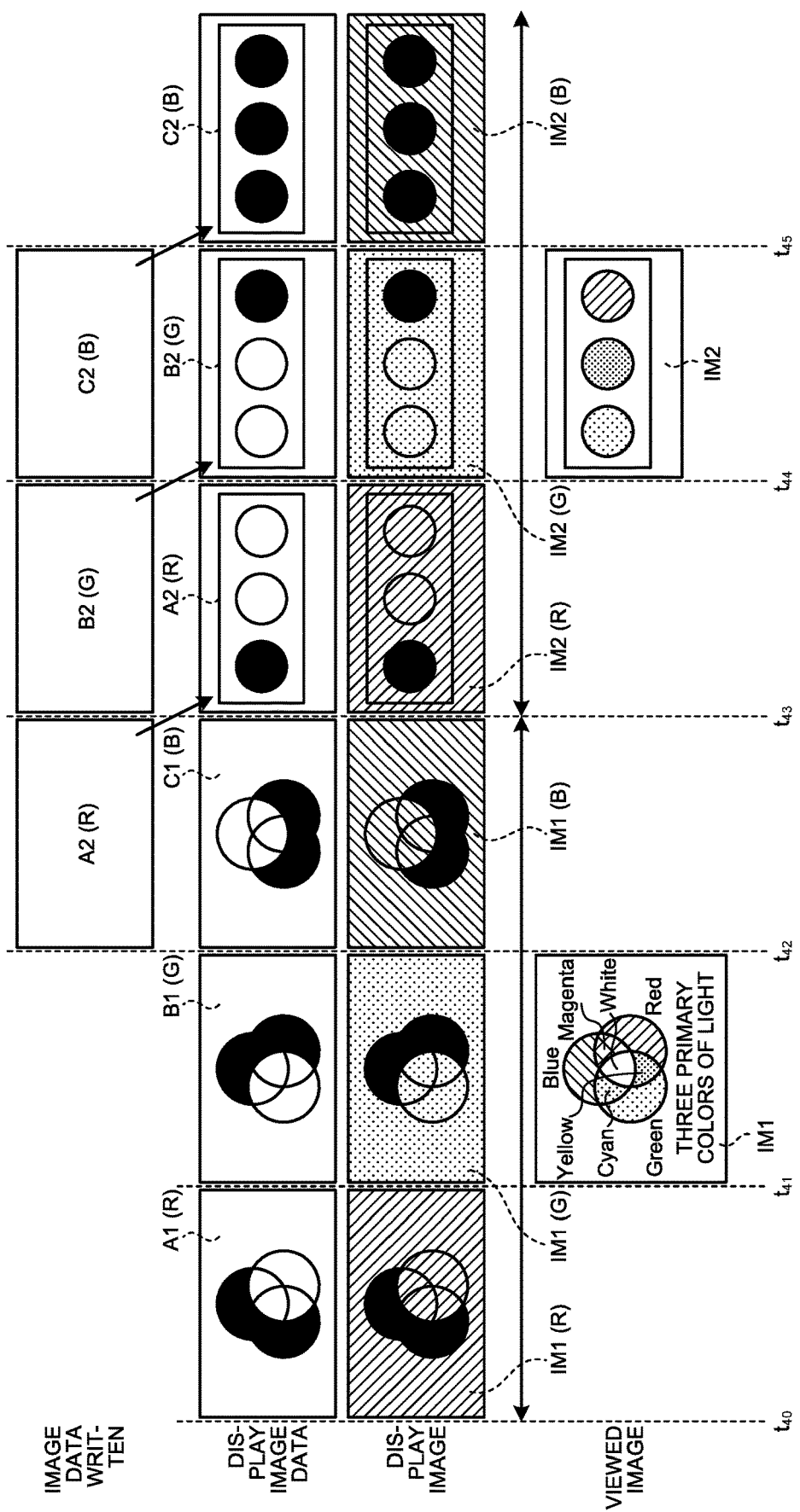
FIG. 15 is a diagram illustrating images sequentially displayed on the display device according to the first embodiment.

FIG. 15 is a diagram illustrating images sequentially displayed on the display device according to the first embodiment.

Referring to FIG. 15, at time $t_{40}$, all the pixels SPix display the image based on the image data A1(R). The light source $35_R$ emits light in red (R). As a result, the display device 1 displays the red image IM1(R) obtained by irradiating the image based on the image data A1(R) with the light in red (R). The red image IM1(R) reaches the eyes of the viewer.

At time $t_{41}$, all the pixels SPix display the image based on the image data B1(G). The light source $35_G$ emits light in green (G). As a result, the display device 1 displays the green image IM1(G) obtained by irradiating the image based on the image data B1(G) with the light in green (G). The green image IM1(G) reaches the eyes of the viewer.

At time $t_{42}$, all the pixels SPix display the image based on the image data C1(B). The light source $35_B$ emits light in blue (B). As a result, the display device 1 displays the blue image IM1(B) obtained by irradiating the image based on the image data C1(B) with the light in blue (B). The blue image IM1(B) reaches the eyes of the viewer.

In this manner, from time $t_{40}$ to time $t_{42}$, the display device 1 sequentially displays the images IM1(R), IM1(G), and IM1(B). Thus, the viewer can visually recognize the color image IM1 in which the colors of the images IM1(R), IM1(G), and IM1(B) are mixed.

From time $t_{42}$ to time $t_{43}$, the image data A2(R) is written to the first memories 51 of all the pixels SPix. From time $t_{42}$ to time $t_{43}$, the image IM1(B) based on the image data C1(B) being stored in the third memories 53 of all the pixels SPix is displayed; however, the first memories 51 are not referred to. Thus, from time $t_{42}$ to time $t_{43}$, the image data A2(R) can be written to the first memories 51.

At time $t_{43}$, all the pixels SPix display the image based on the image data A2(R). The light source $35_R$ emits light in red (R). As a result, the display device 1 displays a red (R) image IM2(R) obtained by irradiating the image based on the image data A2(R) with the light in red (R). The red image IM2(R) reaches the eyes of the viewer.

From time $t_{43}$ to time $t_{44}$, the image data B2(G) is written to the second memories 52 of all the pixels SPix. From time $t_{43}$ to time $t_{44}$, the image IM2(R) based on the image data A2(R) being stored in the first memories 51 of all the pixels SPix is displayed; however, the second memories 52 are not referred to. Thus, from time $t_{43}$ to time $t_{44}$, the image data B2(G) can be written to the second memories 52. At time $t_{44}$, all the pixels SPix display the image based on the image data B2(G). The light source $35_G$ emits light in green (G). As a result, the display device 1 displays a green image IM2(G) obtained by irradiating the image based on the image data B2(G) with the light in green (G). The green image IM2(G) reaches the eyes of the viewer.

From time $t_{44}$ to time $t_{45}$, the image data C2(B) is written to the third memories 53 of all the pixels SPix. From time $t_{44}$ to time $t_{45}$, the image IM2(G) based on the image data B2(G) being stored in the second memories 52 of all the pixels SPix is displayed; however, the third memories 53 are not referred to. Thus, from time $t_{44}$ to time $t_{45}$, the image data C2(B) can be written to the third memories 53.

At time $t_{45}$, all the pixels SPix display the image based on the image data C2(B). The light source $35_B$ emits light in blue (B). As a result, the display device 1 displays a blue image IM2(B) obtained by irradiating the image based on the image data C2(B) with the light in blue (B). The blue image IM2(B) reaches the eyes of the viewer.

In this manner, from time $t_{43}$ to time $t_{45}$, the display device 1 sequentially displays the images IM2(R), IM2(G), and IM2(B). As a result, the viewer can visually recognize a color image IM2 in which the colors of the images IM2(R), IM2(G), and IM2(B) are mixed.

Thus, the display device 1 can perform the color animation display (color moving image display).

1-7. Modification

Figure 16:
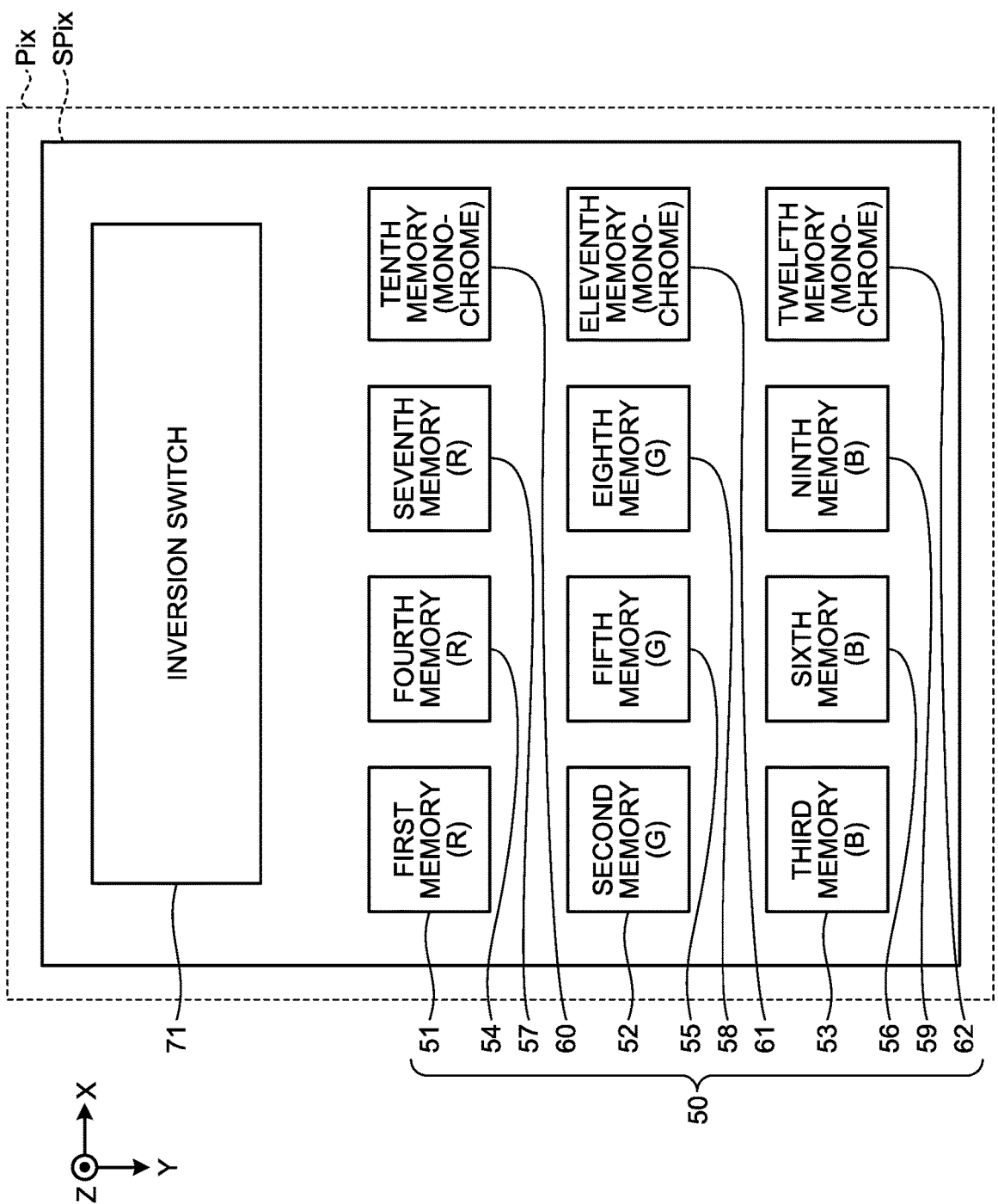
FIG. 16 is a diagram illustrating a modification of the pixel of the display device according to the first embodiment.

FIG. 16 is a diagram illustrating a modification of the pixel of the display device according to the first embodiment. The pixel region Pix includes the pixel SPix.

The pixel SPix includes the memory block 50 and the inversion switch 71. The memory block 50 includes the first memory 51 to a twelfth memory 62. The first memory 51, the fourth memory 54, and the seventh memory 57 store therein pixel data for displaying red (R) images. The second memory 52, the fifth memory 55, and the eighth memory 58 store therein pixel data for displaying green (G) images. The third memory 53, the sixth memory 56, and the ninth memory 59 store therein pixel data for displaying blue (B) images. The tenth memory 60 to the twelfth memory 62 store therein pixel data for displaying monochrome images.

The tenth memory 60 to the twelfth memory 62 each correspond to the predetermined memory.

The display device 1 refers to the memories in the order of the first memory 51, the second memory 52, and then the third memory 53, and causes the light sources to emit light in the order of the light source $35_R$, the light source $35_G$, and then the light source $35_B$; thereby, the viewer can visually recognize a first color image. The display device 1 refers to the memories in the order of the fourth memory 54, the fifth memory 55, and then the sixth memory 56, and causes the light sources to emit light in the order of the light source $35_R$, the light source $35_G$, and then the light source $35_B$; thereby, the viewer can visually recognize a second color image. The display device 1 refers to the memories in the order of the seventh memory 57, the eighth memory 58, and then the ninth memory 59, and causes the light sources to emit light in the order of the light source $35_R$, the light source $35_G$, and then the light source $35_B$; thereby, the viewer can visually recognize a third color image.

Thus, the display device 1 can perform the color animation display (color moving image display).

The display device 1 may repeatedly display a first image to a third image in the order of the first image (the viewer views the first color image), the second image (the viewer views the second color image), the third image (the viewer views the third color image), the first image (the viewer views the first color image), . . . .

The display device 1 can display a first monochrome image by referring to the tenth memory 60, and by not causing the light sources to emit light. The display device 1 can display a second monochrome image by referring to the eleventh memory 61, and by not causing the light sources to emit light. The display device 1 can display a third monochrome image by referring to the twelfth memory 62, and by not causing the light sources to emit light.

Accordingly, the display device 1 can perform monochrome animation display (monochrome moving image display) in the order of the first monochrome image, the second monochrome image, and then the third monochrome image by referring to the memories in the order of the tenth memory 60, the eleventh memory 61, and then the twelfth memory 62, and by not causing the light sources to emit light.

The display device 1 may repeatedly display the first to third monochrome images in the order of the first monochrome image, the second monochrome image, the third monochrome image, the first monochrome image, . . . .

The display device 1 may repeatedly display the first to third images and the first to third monochrome images in the order of the first image (the viewer views the first color image), the second image (the viewer views the second color image), the third image (the viewer views the third color image), the first monochrome image, the second monochrome image, the third monochrome image, the first image (the viewer views the first color image), . . . .

1-8. Application Example

Figure 17:
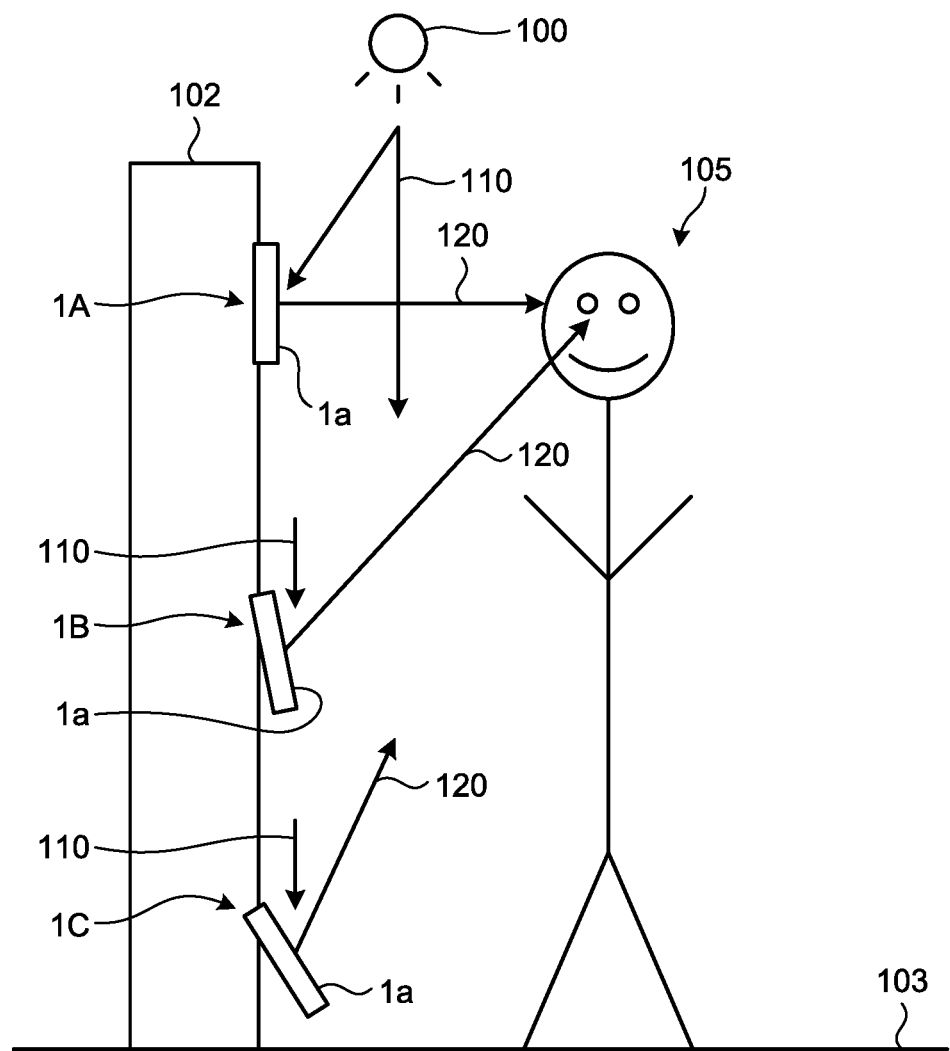
FIG. 17 is a diagram illustrating an application example of the display device according to the first embodiment.

FIG. 17 is a diagram illustrating an application example of the display device according to the first embodiment. FIG. 17 is a diagram illustrating an example in which the display device 1 is applied to electronic shelf labels.

As illustrated in FIG. 17, display devices 1A, 1B, and 1C are mounted on shelving 102. Each of the display devices 1A, 1B, and 1C has the same configuration as that of the display device 1 described above. The display devices 1A, 1B, and 1C are mounted at different heights from a floor surface 103 and mounted so as to have different panel inclination angles. The panel inclination angle is an angle formed between the normal line to the display surface 1a and the horizontal direction. The display devices 1A, 1B, and 1C reflect incident light 110 from a lighting device 100 serving as a light source to output an image 120 toward a viewer 105.

2. Second Embodiment

Figure 18:
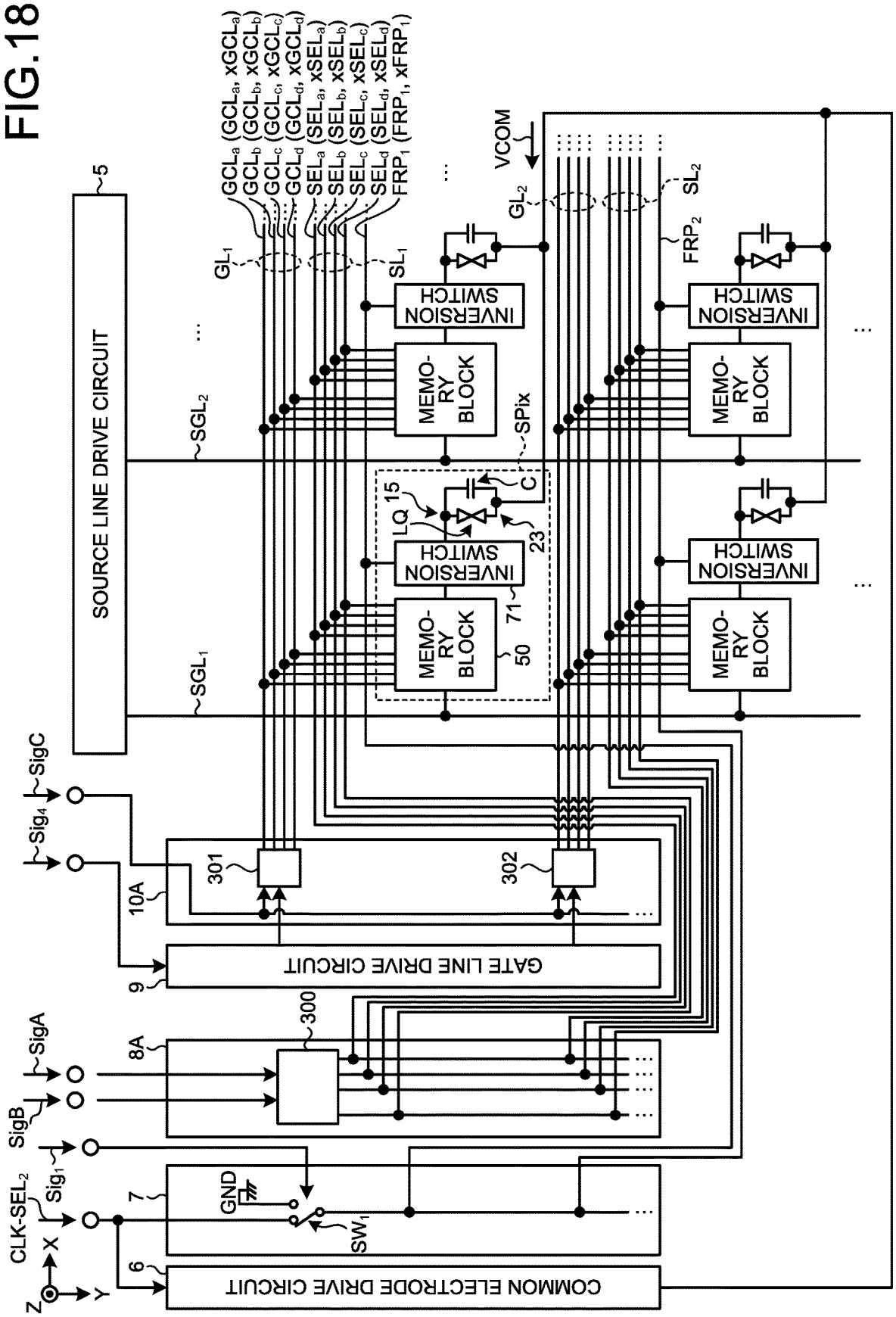
FIG. 18 is a diagram illustrating a circuit configuration of a display device according to a second embodiment.

FIG. 18 is a diagram illustrating a circuit configuration of a display device according to a second embodiment. The same components as those of the first embodiment are denoted by the same reference numerals, and the description thereof will not be repeated. FIG. 18 illustrates 2×2 pixels SPix of all the pixels SPix. A gate line selection circuit 10A includes M decoder circuits 301, 302, . . . corresponding to the M rows of the pixel regions Pix. The M decoder circuits 301, 302, . . . are controlled by a control signal SigC supplied from the timing controller 4b. The timing controller 4b includes a quaternary counter and outputs the control signal SigC based on a register set value.

When the control signal SigC is "0" and the gate signal supplied from the gate line drive circuit 9 is at the high level, each of the M decoder circuits 301, 302, . . . outputs the gate signal to the first gate line $GCL_a$.

When the control signal SigC is "1" and the gate signal supplied from the gate line drive circuit 9 is at the high level, each of the M decoder circuits 301, 302, . . . outputs the gate signal to the second gate line $GCL_b$.

When the control signal SigC is "2" and the gate signal supplied from the gate line drive circuit 9 is at the high level, each of the M decoder circuits 301, 302, . . . outputs the gate signal to the third gate line $GCL_c$. When the control signal SigC is "3" and the gate signal supplied from the gate line drive circuit 9 is at the high level, each of the M decoder circuits 301, 302, . . . outputs the gate signal to the fourth gate line $GCL_d$.

FIG. 19 is a timing chart of operation timing of the gate line selection circuit of the display device according to the second embodiment.

A time period from time $t_{61}$ to time $t_{62}$ in which the control signal SigC is "0" is a writing period of the image data to the first memories 51 of the pixels SPix of M rows×N columns. The gate line drive circuit 9 sequentially outputs, from each of the M output terminals, the gate signal for selecting one of the M rows based on the control signal $Sig_4$ supplied from the timing controller 4b. Consequently, the M decoder circuits 301, 302, . . . sequentially output the gate signal to the first gate lines $GCL_a$ of the first to M-th rows.

A time period from time $t_{62}$ to time $t_{63}$ in which the control signal SigC is "1" is a writing period of the image data to the second memories 52 of the pixels SPix of M rows×N columns. The gate line drive circuit 9 sequentially outputs, from each of the M output terminal, the gate signal for selecting one of the M rows based on the control signal $Sig_4$ supplied from the timing controller 4b. Consequently, the M decoder circuits 301, 302, . . . sequentially output the gate signal to the second gate lines $GCL_b$ of the first to M-th rows.

A time period from time $t_{63}$ to time $t_{64}$ in which the control signal SigC is "2" is a writing period of the image data to the third memories 53 of the pixels SPix of M rows×N columns. The gate line drive circuit 9 sequentially outputs, from each of the M output terminals, the gate signal for selecting one of the M rows based on the control signal $Sig_4$ supplied from the timing controller 4b. Consequently, the M decoder circuits 301, 302, . . . sequentially output the gate signal to the third gate lines $GCL_c$ of the first to M-th rows.

A time period from time $t_{64}$ to time $t_{65}$ in which the control signal SigC is "3" is a writing period of the image data to the fourth memories 54 of the pixels SPix of M rows×N columns. The gate line drive circuit 9 sequentially outputs, from each of the M output terminals, the gate signal for selecting one of the M rows based on the control signal $Sig_4$ supplied from the timing controller 4b. Consequently, the M decoder circuits 301, 302, . . . sequentially output the gate signal to the fourth gate lines $GCL_d$ of the first to M-th rows.

Referring again to FIG. 18, a memory selection circuit 8A includes a decoder circuit 300. The decoder circuit 300 is controlled by control signals SigA and SigB supplied from the timing controller 4b. Each of the control signals SigA and SigB is a one-bit signal, and the control signals SigA and SigB constitute a two-bit signal. The timing controller 4b includes a ternary counter and outputs the control signals SigA and SigB based on the register set value.

When the control signals SigA and SigB indicate "0", the decoder circuit 300 outputs the memory selection signal to the first memory selection lines $SEL_a$.

When the control signals SigA and SigB indicate "1", the decoder circuit 300 outputs the memory selection signal to the second memory selection lines $SEL_b$.

When the control signals SigA and SigB indicate "2", the decoder circuit 300 outputs the memory selection signal to the third memory selection lines $SEL_c$.

When the control signals SigA and SigB indicate "3", the decoder circuit 300 outputs the memory selection signal to the fourth memory selection lines $SEL_d$.

FIG. 20 is a timing chart of operation timing of the memory selection circuit of the display device according to the second embodiment.

A time period from time $t_{71}$ to time $t_{72}$ in which the control signals SigA and SigB indicate "3" is a selection period of the fourth memories 54 of the pixels SPix of M rows×N columns. The decoder circuit 300 outputs the memory selection signal to the fourth memory selection lines $SEL_d$ of the first to M-th rows. This operation causes the display device 1 to display a monochrome image.

A time period from time $t_{72}$ to time $t_{73}$ in which the control signals SigA and SigB indicate "0" is a selection period of the first memories 51 of the pixels SPix of M rows×N columns. The decoder circuit 300 outputs the memory selection signal to the first memory selection lines $SEL_a$ of the first to M-th rows. This operation causes the display device 1 to display a red (R) image.

A time period from time $t_{73}$ to time $t_{74}$ in which the control signals SigA and SigB indicate "1" is a selection period of the second memories 52 of the pixels SPix of M rows×N columns. The decoder circuit 300 outputs the memory selection signal to the second memory selection lines $SEL_b$ of the first to M-th rows. This operation causes the display device 1 to display a green (G) image.

A time period from time $t_{74}$ to time $t_{75}$ in which the control signals SigA and SigB indicate "2" is a selection period of the third memories 53 of the pixels SPix of M rows×N columns. The decoder circuit 300 outputs the memory selection signal to the third memory selection lines $SEL_c$ of the first to M-th rows. This operation causes the display device 1 to display a blue (B) image.

The preferred embodiments of the present invention have been described above. The present invention is, however, not limited to the embodiments described above. The content disclosed in the embodiments is merely an example, and can be variously modified within the scope not departing from the gist of the present invention. Any modifications appropriately made within the scope not departing from the gist of the present invention also naturally belong to the technical scope of the present invention. At least one of various omissions, replacements, and modifications of the components can be made without departing from the gist of the embodiments and the modifications described above.

What is claimed is:

1. A display device comprising:
   a plurality of pixels arranged in a row direction in which rows extend and in a column direction in which columns extend in a display area, each pixel comprising a memory block comprising a plurality of memories configured to store pixel data;
   a plurality of memory selection line groups provided for the respective rows, each group comprising a plurality of memory selection lines electrically coupled to the memory block of each of the pixels belonging to a corresponding one of the rows;
   a memory selection circuit configured to simultaneously output, to the memory selection line groups, a memory selection signal for selecting one of the memories in the memory block;
   a plurality of light sources configured to emit light in a plurality of colors;
   a light source selection circuit configured to, in synchronization with the selection of the memory, select which light source is to be used to emit light; and
   a light guide plate configured to guide, to the display area, the light emitted from the light source selected from the light sources,
   wherein each of the pixels is configured such that one of the memories is selected in accordance with the memory selection line supplied with the memory selection signal and the pixel displays an image based on the pixel data being stored in the selected memory, and
   wherein the light source selected by the light source selection circuit emits the light over an entire period of time in which the one memory is selected.

2. The display device according to claim 1,
   wherein the memory selection circuit is configured to sequentially select each memory selection line as an output destination of the memory selection signal in each of the memory selection line groups,
   wherein each of the pixels is configured such that each of the memories in the memory block is sequentially selected in accordance with the sequential selection of each memory selection line as the output destination of the memory selection signal and the pixel sequentially displays a plurality of images based on the pixel data being stored in each selected memory, and
   wherein the light source selection circuit is configured to, in synchronization with the sequential selection of each memory selection line as the output destination of the memory selection signal, sequentially select which light source is to be used to emit light.

3. The display device according to claim 1,
   wherein the light source selection circuit is configured such that, when a predetermined memory of the memories in each of the memory blocks is selected by the memory selection circuit, the light source selection circuit does not select any of the light sources.

4. The display device according to claim 1,
wherein each of the pixels further comprises:
- a pixel electrode; and
- a switch circuit configured to output a potential based on the pixel data output from the memory block to the pixel electrode, wherein the display device further comprises:
- a common electrode configured to be supplied with a common potential common to the pixels;
- a common electrode drive circuit configured to invert the common potential in synchronization with a clock signal and output the inverted common potential to the common electrode;
- a plurality of display signal lines that are electrically coupled to the switch circuits of the pixels; and
- an inversion drive circuit configured to output, to the display signal lines, a display signal synchronized with the clock signal or an inverted display signal obtained by inverting the display signal, and wherein the switch circuit of each pixel is configured to output the display signal or the inverted display signal to the pixel electrode based on the pixel data output from the memory block.

5. The display device according to claim 1, further comprising:
- a plurality of gate line groups provided for the respective rows, each of the gate line groups comprising a plurality of gate lines electrically coupled to the memory block of each of the pixels belonging to a corresponding one of the rows;
- a gate line drive circuit configured to output a gate signal to select one of the rows in writing the pixel data to the memory block;
- a plurality of source lines provided for the respective columns;
- a source line drive circuit configured to output a plurality of pieces of the pixel data to the source lines in writing the pixel data to the memory block; and
- a gate line selection circuit configured to couple one of the gate lines in each of the gate line groups to the gate line drive circuit in writing the pixel data to the memory block, wherein the pixels are configured such that the pixels in the row supplied with the gate signal each store the pixel data supplied to a corresponding one of the source lines into one of the memories in the memory block selected in accordance with the gate line supplied with the gate signal.

6. The display device according to claim 5,
wherein each pixel is configured such that, during a period of time in which the image is displayed based on the pixel data in one of the memories corresponding to the memory selection line supplied with the memory selection signal, the pixel data supplied to the source line corresponding to the pixel is stored into another of the memories corresponding to the gate line supplied with the gate signal.

* * * * *